(12) United States Patent
Maehara et al.

(10) Patent No.: US 7,215,415 B2
(45) Date of Patent: May 8, 2007

(54) MEASUREMENT METHOD BY OTDR AND TERMINAL STATION APPARATUS

(75) Inventors: Takayuki Maehara, Kawasaki (JP); Shinichirou Harasawa, Kawasaki (JP); Gentaro Funatsu, Yokohama (JP); Hideki Maeda, Yokohama (JP); Akira Naka, Yokosuka (JP)

(73) Assignees: Fujitsu Limited, Kawasaki (JP); Nippon Telegraph and Telephone Corporation, Tokyo (JP)

( * ) Notice: Subject to any disclaimer, the term of this patent is extended or adjusted under 35 U.S.C. 154(b) by 394 days.

(21) Appl. No.: 10/798,899

(22) Filed: Mar. 12, 2004

(65) Prior Publication Data

US 2005/0110980 A1 May 26, 2005

(30) Foreign Application Priority Data

Mar. 14, 2003 (JP) .............................. 2003-070318

(51) Int. Cl.
*G01N 21/00* (2006.01)
(52) U.S. Cl. .................................................... 356/73.1
(58) Field of Classification Search ................ 356/73.1; 359/334, 337, 341.1; 385/12
See application file for complete search history.

(56) References Cited

U.S. PATENT DOCUMENTS

| | | | |
|---|---|---|---|
| 5,298,965 A | 3/1994 | Spirit et al. | |
| 5,778,117 A | 7/1998 | Inoue et al. | |
| 5,907,417 A | 5/1999 | Darcie et al. | |
| 5,959,750 A | 9/1999 | Eskildsen et al. | |
| 6,028,684 A | 2/2000 | Kidorf | |
| 6,342,965 B1 | 1/2002 | Kinoshita | |
| 6,671,083 B2* | 12/2003 | Tanaka et al. | 359/334 |
| 6,831,777 B2* | 12/2004 | Tanaka et al. | 359/341.2 |
| 2002/0008901 A1 | 1/2002 | Kinoshita | |
| 2002/0109909 A1 | 8/2002 | Kinoshita | |
| 2004/0207911 A1 | 10/2004 | Kinoshita | |
| 2006/0018008 A1 | 1/2006 | Kinoshita | |

FOREIGN PATENT DOCUMENTS

| | | |
|---|---|---|
| JP | 09-179152 | 7/1997 |
| JP | 09-261187 | 10/1997 |
| WO | WO 97/23964 | 7/1997 |
| WO | WO 01/69821 | 9/2001 |
| WO | WO 02/30017 | 4/2002 |

OTHER PUBLICATIONS

Preliminary Search Report issued in the corresponding French Patent Application 0402566.
Huai H. Kee et al., "Extended-range optical time domain-reflectometry system at 1.65 μm based on delayed Raman amplification" Mar. 1, 1998,vol. 23, No. 5, Optics Letters, pp. 349-351.
E. Cottino et al, "Dynamic range increase of 1625 nm monitoring systems", International Wire & Cable Symposium Proceedings 1995, pp. 654-661.

* cited by examiner

*Primary Examiner*—Gregory J. Toatley, Jr.
*Assistant Examiner*—Michael A. Lyons
(74) *Attorney, Agent, or Firm*—Staas & Halsey LLP

(57) ABSTRACT

In a method for performing OTDR measurement in an optical transmission system including a first terminal station and a second terminal station, OTDR signal light is transmitted from an OTDR provided in the first terminal station to the second terminal station, in which the OTDR signal light is Raman amplified by using main signal light of the optical transmission system as pump light.

10 Claims, 19 Drawing Sheets

MEASUREMENT METHOD BY OTDR AND TERMINAL STATION APPARATUS

CROSS-REFERENCE TO RELATED APPLICATION

This patent application is based on Japanese Priority Patent Application No. 2003-070318, filed on Mar. 14, 2003, the entire contents of which are hereby incorporated by reference.

BACKGROUND OF THE INVENTION

1. Field of the Invention

The present invention relates to a technique for measuring loss distribution along a length of optical fiber in an optical transmission system by using an OTDR (optical time domain reflectometer).

2. Description of the Related Art

The OTDR is used for detecting distance distribution of transmission loss in optical fiber or for locating fiber fault or the like. By using the OTDR, a pulse of light is transmitted down the fiber and the backscattered signal is detected. The intensity of the backscattered light provides a measure of the loss in the optical fiber, and the time between transmitting the pulse and obtaining the backscattered light provides a measure of distance in the optical fiber.

There are two types of transmission systems using optical fiber. One type (referred to as "relay transmission system" hereinafter) is a transmission system in which relays are provided at regular intervals on a transmission line between both terminal stations. Another type (referred to as "no-relay transmission system" hereinafter) is a transmission system in which no relay is provided on the transmission line. As to the relay transmission system, an optical transmission system capable of long distance measurement can be realized by amplifying light by using EDF (erbium doped fiber) in each relay. In addition, as to the relay transmission system, long distance measurement across the relay can be performed by using C-OTDR that supports coherent detection.

On the other hand, as to the no-relay system, a low cost system can be realized. However, transmission distance is limited even though Raman amplification is performed since no relay is provided. Therefore, transmission distance of OTDR signal light is limited so that measurement distance from a terminal station that has an OTDR is limited. As a form of the no-relay transmission system for increasing transmission distance, a remote pump system is used in which a remote amplifier including EDF is provided on a transmission line at a position a predetermined distance apart from a terminal station. However, from the viewpoint of measurement by OTDR, since absorption loss by EDF is large at 1550 nm band that is generally used as OTDR signal light, it is difficult to measure loss distribution beyond EDF from a terminal station that performs OTDR measurement. In addition, even when light of 1650 nm band that can pass through the EDF is used, good S/N ratio cannot be obtained since transmission loss by optical fiber is large at the 1650 nm band. Therefore, it is difficult to measure loss distribution along a long distance length of optical fiber by the no-relay transmission system.

As mentioned above, as to the no-relay transmission system, there is a problem in that OTDR measurement of loss distribution cannot be performed for a long span optical transmission line.

Following are example documents relating to the technical field of the present invention:

(1) Huai H. Kee et al. "Extended-range optical time domain-reflectometry system at 1.65 μm based on delayed Raman amplification", Optical Letters Vol. 23, No. 5 Mar. 1, 1998, pp. 249–351, (2) E. Cottino et al. "DYNAMIC RANGE INCREASE OF 1625 nm MONITORING SYSTEMS", International Wire & Cable Symposium Proceedings 1995, pp. 654–661.

SUMMARY OF THE INVENTION

An object of the present invention is to provide techniques for performing OTDR measurement of a long span transmission line in an optical transmission system.

The above-mentioned object is achieved by a method for performing OTDR measurement in an optical transmission system including a first terminal station and a second terminal station, wherein OTDR signal light is transmitted from an OTDR provided in the first terminal station to the second terminal station, in which the OTDR signal light is Raman amplified by using main signal light of the optical transmission system as pump light.

According to the present invention, the main signal light can be used as pump light of OTDR signal light. Therefore, the OTDR signal light is Raman amplified so that the dynamic range is increased and a long span optical transmission line can be surveyed without newly providing any pump light source for the OTDR signal light.

In the method, the OTDR signal light may be Raman amplified by using the main signal light that is transmitted from the first terminal station, or by using the main signal light transmitted from the second terminal station. In addition, the OTDR signal light can be Raman amplified by using bidirectional main signal light as bidirectional pump light. Accordingly, the effect of Raman amplification can be enhanced.

In addition, in the method of the present invention, the main signal light used as the pump light for the OTDR signal light may be Raman amplified by using pump light, transmitted from the first terminal station, that is usually used for Raman amplifying main signal light transmitted from the second terminal station to the first terminal station.

In the method, a wavelength band of the main signal light of the optical transmission system may be 1550 nm band, and a wavelength band of the OTDR signal light may be 1650 nm band. By using these wavelength bands, effective Raman amplification can be realized. In addition, by using the 1650 nm band OTDR signal light, measurement of optical transmission line beyond EDF can be realized even in an optical transmission system including EDF.

The above-mentioned object can be also achieved by a method for performing OTDR measurement in an optical transmission system including a first terminal station and a second terminal station, wherein OTDR signal light is transmitted from an OTDR provided in the first terminal station to the second terminal station, in which the OTDR signal light is remote pump amplified or Raman amplified by using pump light for remote pump amplification that is transmitted from the first terminal station. In the method, a wavelength band of the OTDR signal light is 1550 nm band that is the same as the main signal light.

A terminal station apparatus in the optical transmission system includes a transmitting apparatus for transmitting main signal light to a first optical transmission line and a receiving apparatus for receiving main signal light from a second optical transmission line, and the terminal station apparatus includes a part for transmitting the main signal light from the transmitting apparatus to the second optical transmission line. Accordingly, the main signal light can be used as pump light of OTDT signal light transmitted from an opposite terminal station.

In addition, by providing a part for transmitting light that is emitted from a Raman amplification light source provided in the receiving apparatus side to the first optical transmission line, the light emitted from the Raman amplification light source can be used as pump light for amplifying main signal light that is used as pump light for the OTDR signal light.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, embodiments of the present invention are described with reference to figures. In the embodiments of the present invention, Raman amplification or remote pump amplification for OTDR signal light is performed by using main signal light of 1550 nm band (C-band) or pump light of the main signal light as pump light.

The measuring methods of the following embodiments can be applied to C-OTDR as well as OTDR. In this specification, the word "OTDR" includes the notion of C-OTDR unless otherwise specified.

First, the configuration of the optical transmission system in accordance with an embodiment of the present invention is described with reference to FIG. 1.

Figure 1:
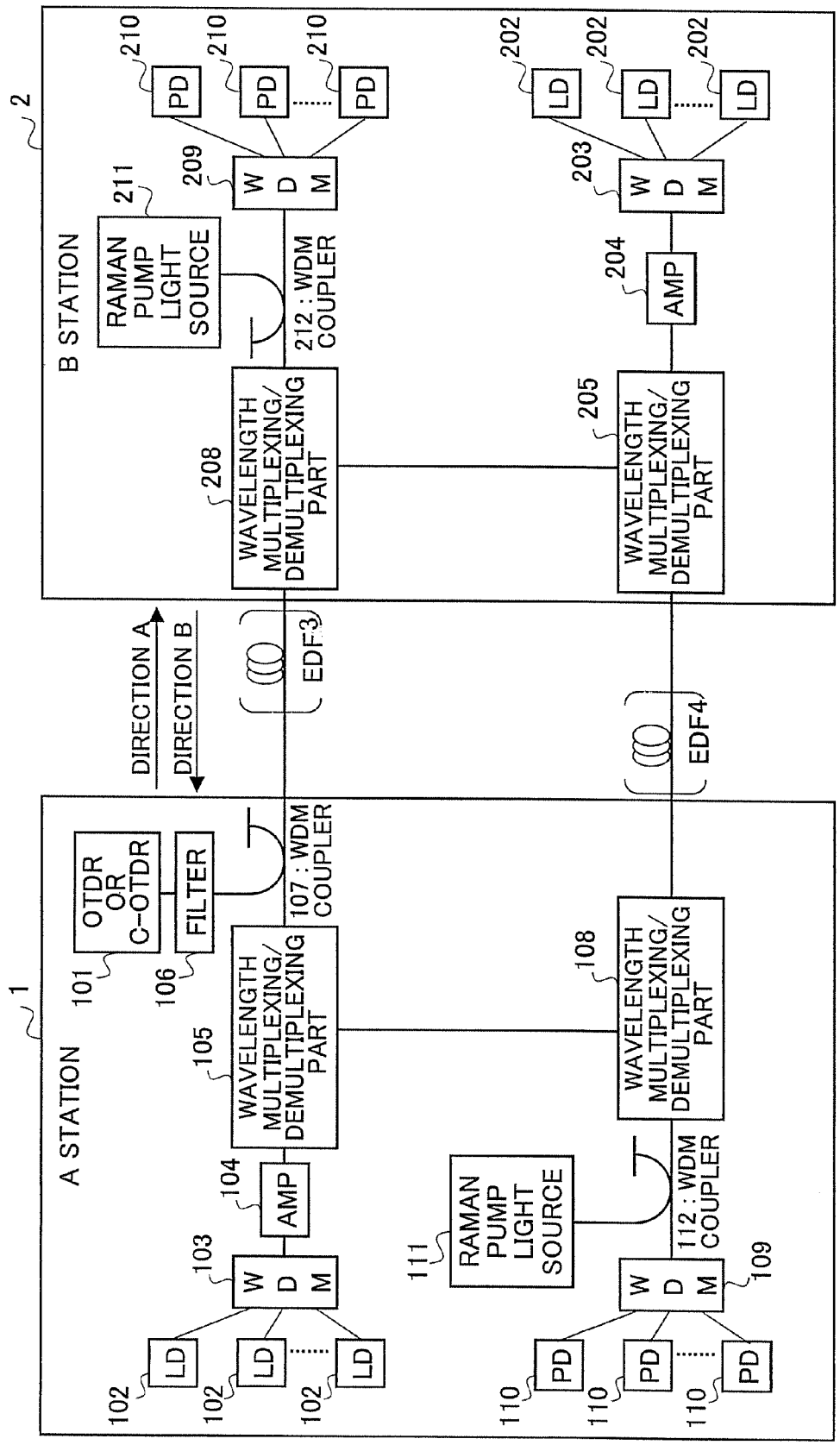
FIG. 1 shows a block diagram of an optical transmission system according to an embodiment of the present invention.

The optical transmission system shown in FIG. 1 is a no-relay type optical transmission system in which an A station 1 and a B station 2 are proved as terminal stations. Taking a direction A as an example, main signal light is transmitted from the A station to the B station, and Raman pump light or remote pump light for Raman amplifying the main signal light is transmitted from the B station 2. The A station 1 is provided with an OTDR 101 in order to perform optical transmission line measurement by using OTDR from the A station a. The optical transmission system includes an EDF 3 and an EDF 4 so as to form a remote pump optical amplifying system. However, the present invention is also applicable to a system having no EDF in which only Raman amplifying is performed.

Next, the configuration of the A station is described. As shown in FIG. 1, the A station includes, as apparatuses for transmitting light to the B station 2, laser diodes (LD 102), a wavelength division multiplexer (WDM 103), an amplifier (AMP 104), and a wavelength multiplexing/demultiplexing part 105. The laser diodes 102 are light sources of the main signal light. The wavelength division multiplexer 103 is for wavelength-multiplexing the light from the laser diodes 102. The amplifier 104 amplifies light from the wavelength division multiplexer 103. The wavelength multiplexing/demultiplexing part 105 is used in performing OTDR measurement in various ways according to embodiments of the present invention. The A station further includes an OTDR 101 used for performing OTDR measurement, an optical filter 106, and a WDM coupler 107 for wavelength-multiplexing the OTDR signal light with other light and transmitting the multiplexed light over a transmission line in the direction A.

As apparatuses for receiving main signal light from the B station 2, the A station 1 includes a wavelength multiplexing/demultiplexing part 108 used in performing OTDR measurement in various ways according to embodiments of the present invention, a wavelength division multiplexer (WDM 109) for dividing light from the B station 2, and photo diodes (PD 110) for receiving the wave-divided light. Further, the A station 1 includes a Raman remote pump light source 111 and a WDN coupler 112.

The apparatus configuration in the B station 2 is basically the same as that in the A station 1. However, in this embodiment shown in FIG. 1, the B station 2 does not include any OTDR. That is, the B station 2 includes, as apparatuses for transmitting light to the A station 1, laser diodes (LD 202), a wavelength division multiplexer (WDM 203), an amplifier (AMP 204), and a wavelength multiplexing/demultiplexing part 205. As apparatuses for receiving main signal light from the A station 1, the B station 2 includes a wavelength multiplexing/demultiplexing 208, and a wavelength division multiplexer (WDM 209) and photo diodes (PD 210). Further, the B station 2 includes a Raman remote pump light source 211 and a WDN coupler 212.

The wavelength multiplexing/demultiplexing part shown in FIG. 1 is a combination of one or more of an optical switch, a WDM coupler, and a fiber connection switching mechanism and the like. The combination is determined according to a measurement method described in the following embodiments. One or more of the wavelength multiplexing/demultiplexing parts shown in FIG. 1 may not be provided according to the measurement method. Apparatuses included in a terminal station such as the A station and the B station that forms an optical transmission system is referred to as a terminal station apparatus.

In the following, OTDR measurement methods in the optical transmission system shown in FIG. 1 are described as first to fifteenth embodiments. In each following embodiment, same symbols are assigned to parts having the same function. First to eighth embodiments are examples for measurement of "A line", and ninth to fifteenth embodiments are examples for measurement of "B line".

(First Embodiment)

Figure 2:
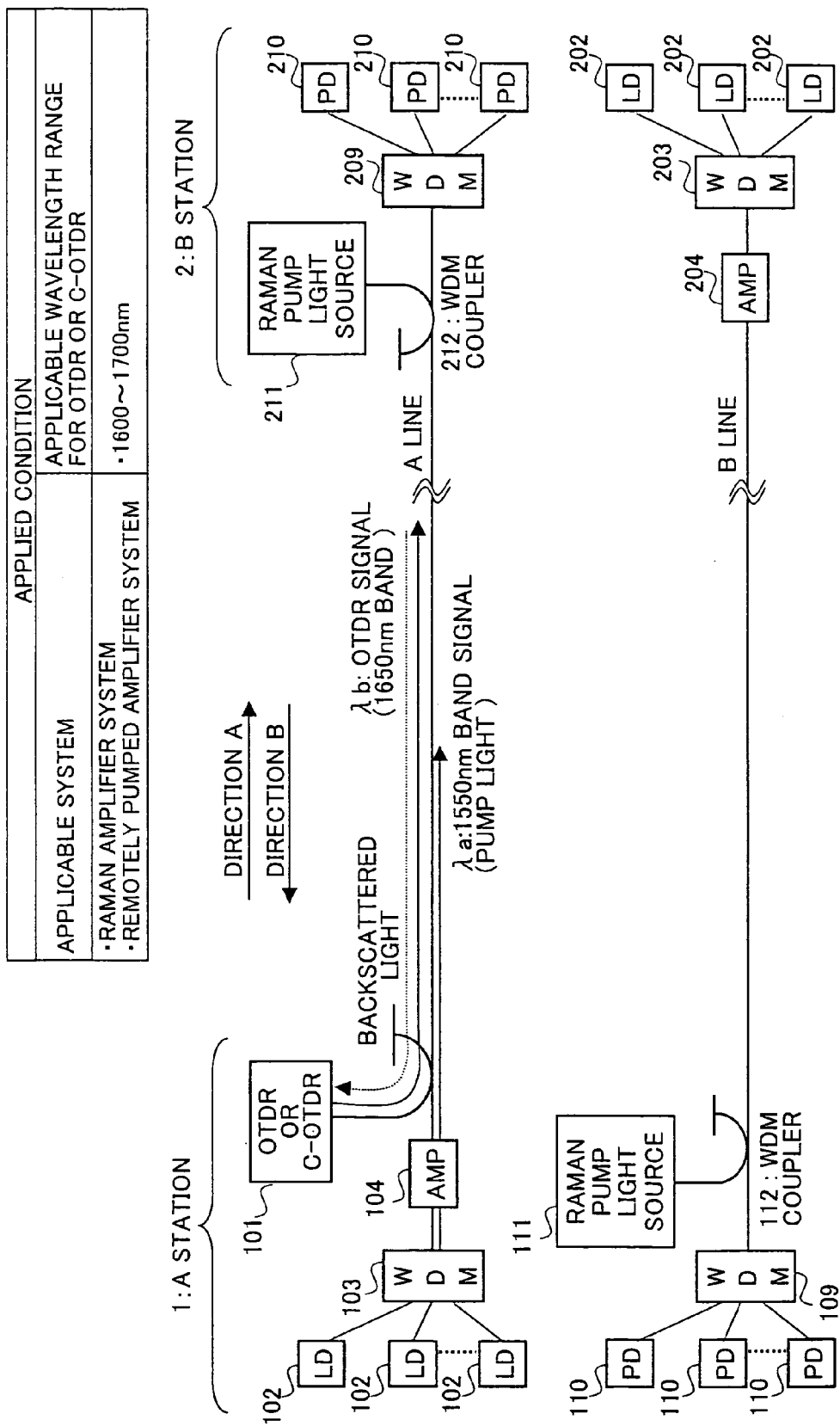
FIG. 2 is a figure for explaining an OTDR measurement method according to a first embodiment of the present invention.

FIG. 2 is a figure for explaining the OTDR measurement method according to the first embodiment of the present invention. As shown in FIG. 2, the wavelength multiplexing/demultiplexing parts 105 and 108 are not provided in this embodiment.

Figure 3:
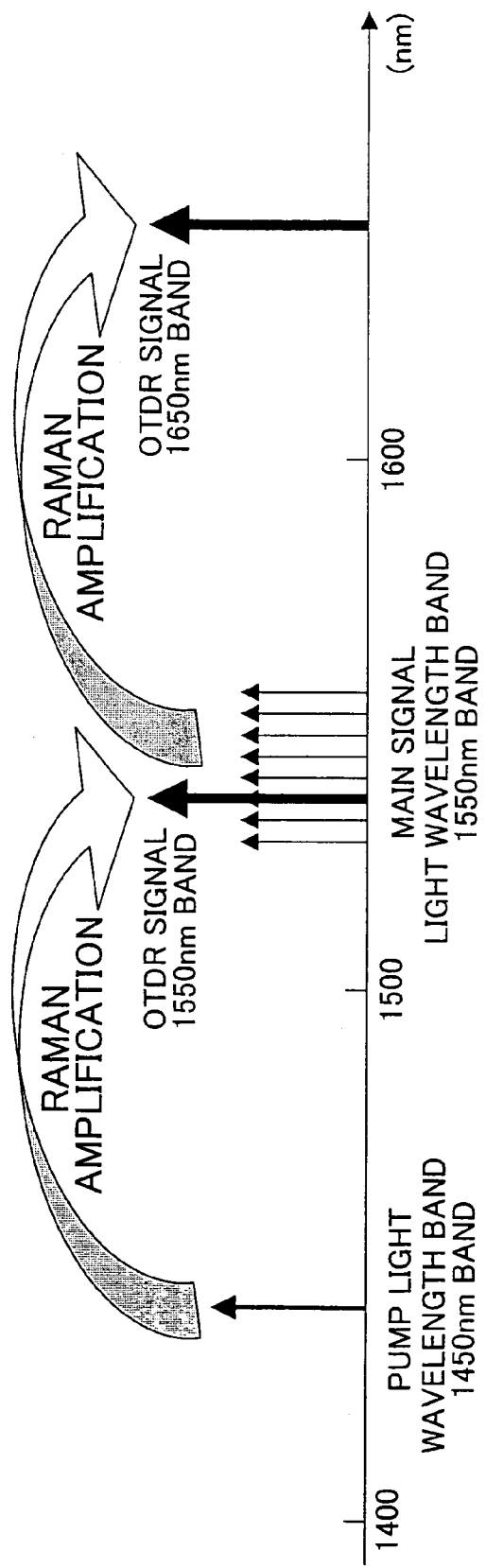
FIG. 3 is a figure for explaining Raman amplification of OTDR signal light.

According to the first embodiment shown in FIG. 2, light of 1650 nm band ($\lambda$b) is used as the OTDR signal light. The wavelength range of the OTDR signal light in this embodiment is 1600–1700 nm. In this embodiment, C-band main signal light ($\lambda$a: 1550 nm band) emitted from the A station 1 is used as pump light to Raman amplify OTDR signal light ($\lambda$b: 1650 nm band) emitted from the OTDR 101, so that the dynamic range is increased. That is, as shown in FIG. 3, since the light of 1650 nm band can be Raman amplified by the light of 1550 nm band, the light emitted from the main signal light source can be used as the Raman pump light for OTDR signal light. The example in which 1550 nm band light is Raman amplified by 1450 nm band light shown in FIG. 3 is described later.

As mentioned above, by using the light of 1650 nm band, as the OTDR signal light, that can be Raman amplified by the main signal light of 1550 nm band, the distance for measuring loss distribution along a length of optical fiber can be largely increased by using the light source for the main signal without newly providing a light source for Raman amplifying the OTDR signal light. In addition, since the light of 1650 nm band is hard to be absorbed by EDF, long distance measurement can be realized even in an optical transmission system including EDF.

(Second Embodiment)

Figure 4:
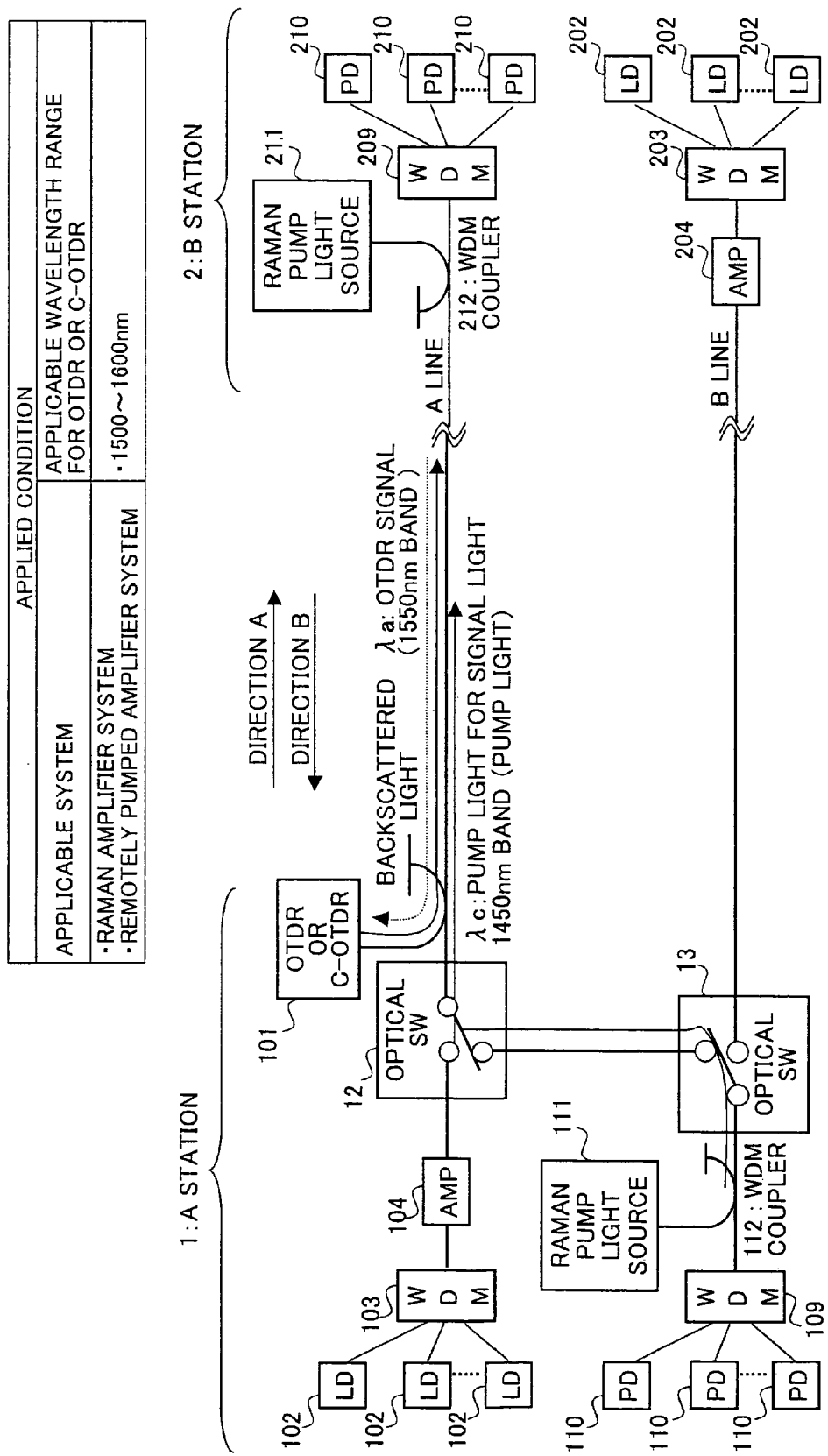
FIG. 4 is a figure for explaining an OTDR measurement method according to a second embodiment of the present invention.

FIG. 4 is a figure for explaining an OTDR measurement method according to the second embodiment of the present invention.

In the second embodiment, light of 1550 nm band ($\lambda$a) that is the same as the main signal light is used as the OTDR signal light. The OTDR signal light is Raman amplified by using pump light ($\lambda$c: 1450 nm band) emitted from the Raman pump light source 111 that is usually used for Raman amplifying signal light transmitted in the B direction, so that the distance of OTDR measurement is increased. The wavelength range of the OTDR signal light in this embodiment is 1500–1600 nm.

In this embodiment, the wavelength multiplexing/demultiplexing parts 105 and 108 function as optical switches 12 and 13 respectively. When OTDR measurement is not performed, the optical switch 12 transmits the main signal light emitted from the AMP 104 over the A line. When OTDR measurement is not performed, the optical switch 12 cuts off the main signal light emitted from the A station light source. Instead of the main signal light, the optical switch 12 transmits pump light switched at the optical switch 13 over the A line. The pump light is wavelength-multiplexed with the OTDR signal light by the WDM coupler 107.

When OTDR measurement is not performed, the optical switch 13 transmits the pump light from the Raman pump light source 111 to the B line. When OTDR measurement is performed, the optical switch 13 transmits the pump light from the Raman pump light source 111 to the optical switch 12 instead of the B line.

According to this embodiment, since a wavelength band same as the main signal light ($\lambda$a: 1550 nm band) can be used as the OTDR signal light, the pump light ($\lambda$c: 1450 nm band) used for Raman amplifying the main signal light can be used for pump light for the OTDR signal light as shown in FIG. 3. As a result of Raman amplifying the OTDR signal light, the distance for measuring loss distribution along a length of optical fiber can be largely increased.

(Third Embodiment)

Figure 5:
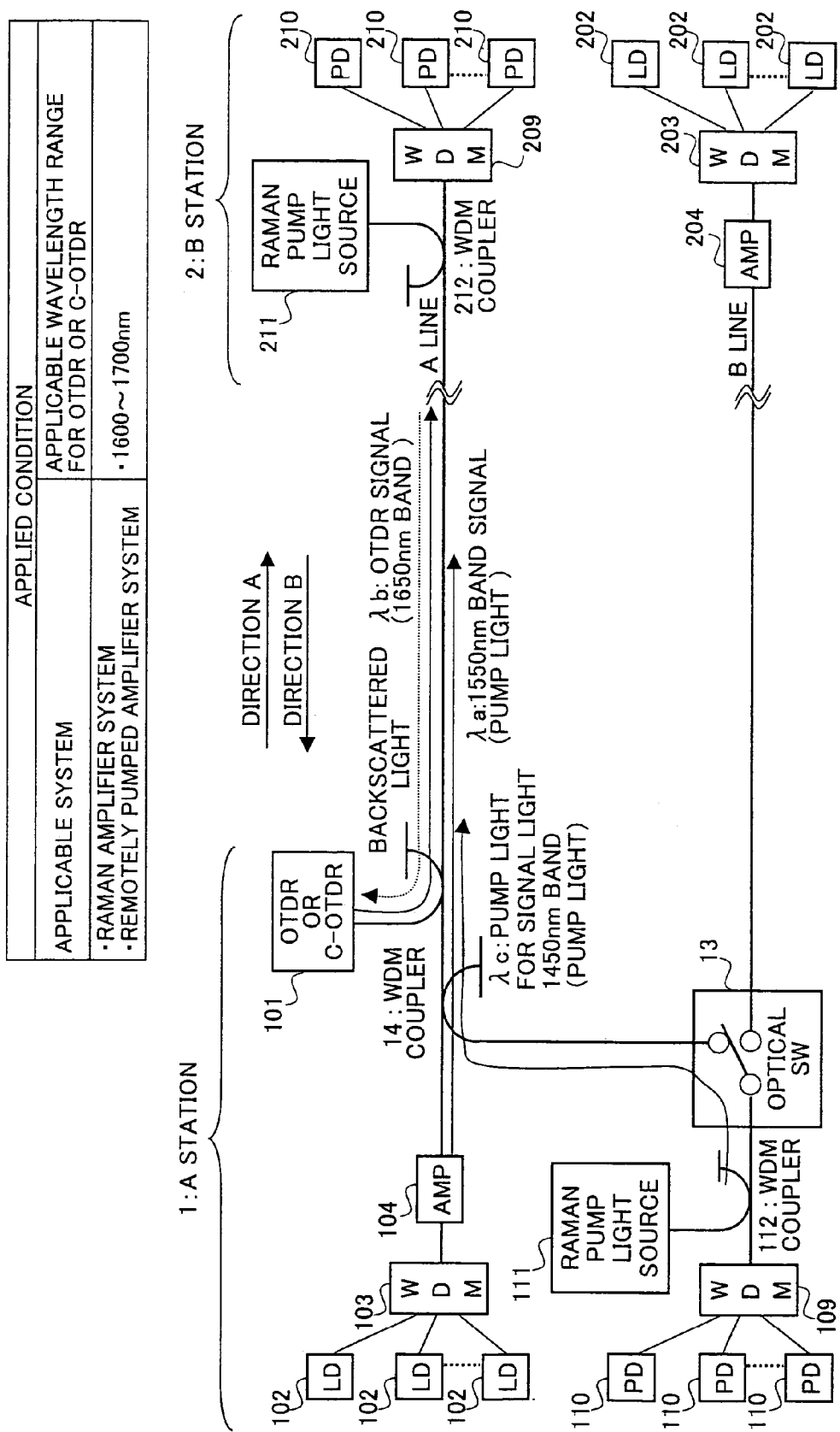
FIG. 5 is a figure for explaining an OTDR measurement method according to a third embodiment of the present invention.

FIG. 5 is a figure for explaining an OTDR measurement method according to the third embodiment of the present invention.

In the third embodiment, light of 1650 nm band ($\lambda$b) is used as the OTDR signal light. The wavelength range of the OTDR signal light in this embodiment is 1600–1700 nm. The OTDR signal light ($\lambda$b: 1650 nm band) from the OTDR 101 is Raman amplified by using the main signal light ($\lambda$a: 1550 nm band) from the A station light source. Further, the main signal light ($\lambda$a: 1550 nm band) used for amplifying the OTDR signal light is Raman amplified by using pump light ($\lambda$c: 1450 nm band) emitted from the Raman pump light source 111. That is, $\lambda$a is pumped by using first-order Stokes wave of $\lambda$c, so that $\lambda$b is pumped by using the original power of $\lambda$a as first-order Stokes wave and using the power of $\lambda$a pumped by $\lambda$c as second-order Stokes wave. Accordingly, the OTDR signal light is amplified so that dynamic range is enlarged and the distance of OTDR measurement is increased.

In this embodiment, the wavelength multiplexing/demultiplexing part 105 in the A line side functions as a WDM coupler 104 shown in FIG. 5. The wavelength multiplexing/demultiplexing part 108 functions as an optical switch 13 shown in FIG. 5.

The WDM coupler 14 wavelength-multiplexing the main signal light from the A station light source with the pump light from the optical switch 13, and transmits the multiplexed light in the A direction. When OTDR measurement is performed, the optical switch 13 transmits the pump light from the A station Raman pump light source 111 to the WDM coupler 14 not to the B line.

According to this embodiment, the main signal light (λa: 1550 nm band) is used as pump light for the OTDR signal light (λb: 1650 nm band). Further, pump light that is usually used as pump light (λc: 1450 nm band) for the main signal light for the B line is used as pump light for the main signal light on the A line, so that the main signal light is Raman amplified. Further, since the amplified main signal light is used as pump light of the OTDR signal light, the distance for measuring loss distribution along a length of optical fiber can be largely increased. In addition, since 1650 nm band is used for the OTDR signal light, long distance measurement can be realized even in an optical transmission system including EDF.

(Fourth Embodiment)

Figure 6:
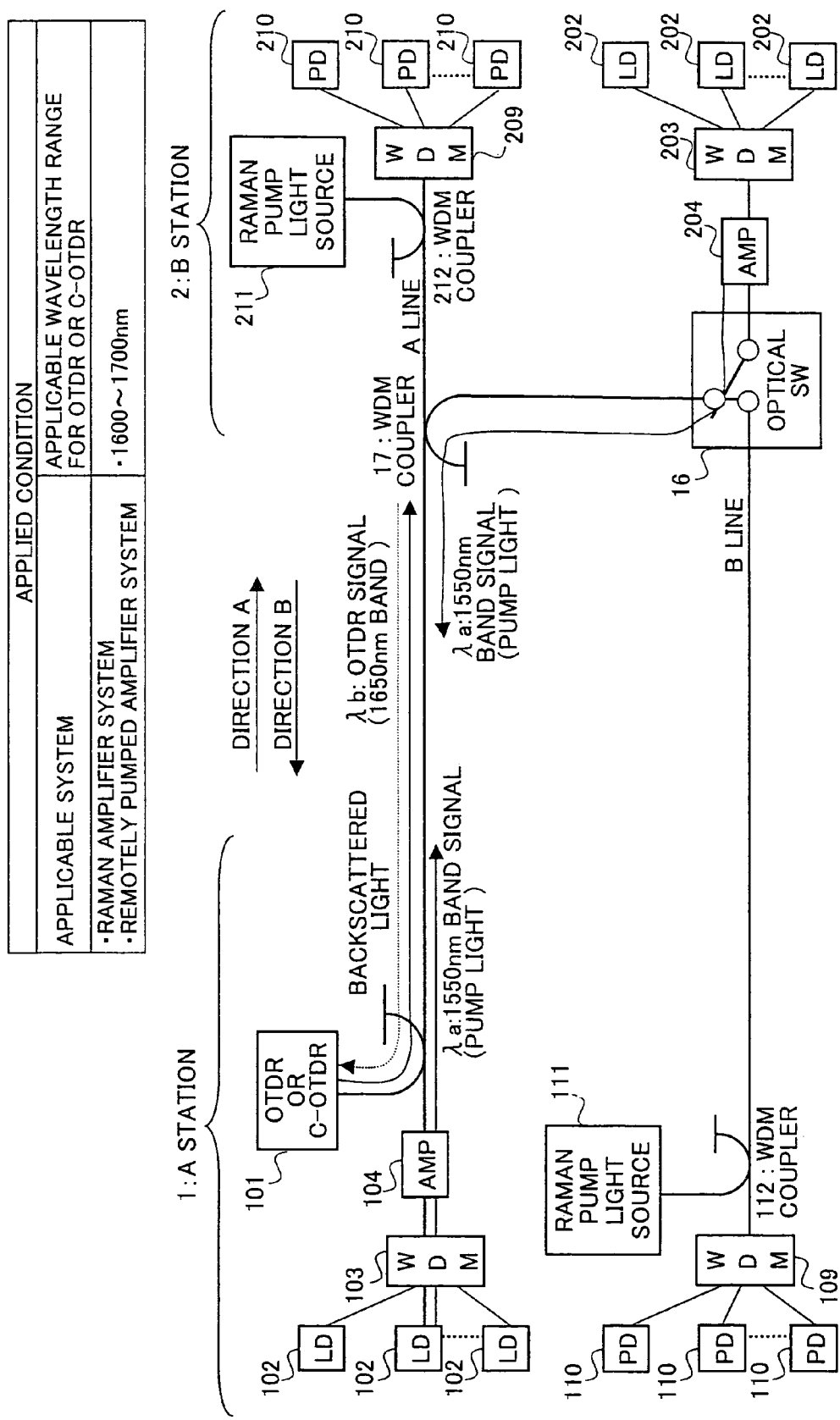
FIG. 6 is a figure for explaining an OTDR measurement method according to a fourth embodiment of the present invention.

FIG. 6 is a figure for explaining an OTDR measurement method according to the fourth embodiment of the present invention.

In the fourth embodiment, light of 1650 nm band (λb) is used as the OTDR signal light. The wavelength range of the OTDR signal light in this embodiment is 1600–1700 nm. The OTDR signal light (λb: 1650 nm band) from the OTDR 101 is Raman amplified by using the main signal light (λa: 1550 nm band) from the A station light source. In addition to that, the OTDR signal light is Raman amplified by using main signal light from the B station light source as pump light. That is, bidirectional main signal light is used as bidirectional pump light for Raman amplifying the OTDR signal light.

In the fourth embodiment, the wavelength multiplexing/demultiplexing part 205 in the B line side in the B station 2 functions as an optical switch 16 shown in FIG. 6. When OTDR measurement is not performed, the optical switch 16 transmits the main signal light (emitted from the AMP 204) from the B station light source to the B line. When OTDR measurement is performed, the optical switch 16 switches the main signal light from the B station light source, and transmits the main signal light to a WDM coupler 17 of the A line side.

Further, the wavelength multiplexing/demultiplexing part 208 in the A line side of the A station 2 functions as the WDM coupler 17 shown in FIG. 6. The WDM coupler 17 transmits the main signal light sent from the B station light source via the optical switch 16 to the A station 1 over the A line.

According to the fourth embodiment, by using the bidirectional main signal light (λa: 1550 nm band) as the bidirectional pump light for the OTDR signal light (λb: 1650 nm band), the distance for measuring loss distribution along a length of optical fiber can be largely increased, so that long distance survey of a transmission line can be performed. In addition, by using 1650 nm band as the OTDR signal light, long distance measurement can be realized even in an optical transmission system including EDF.

(Fifth Embodiment)

Figure 7:
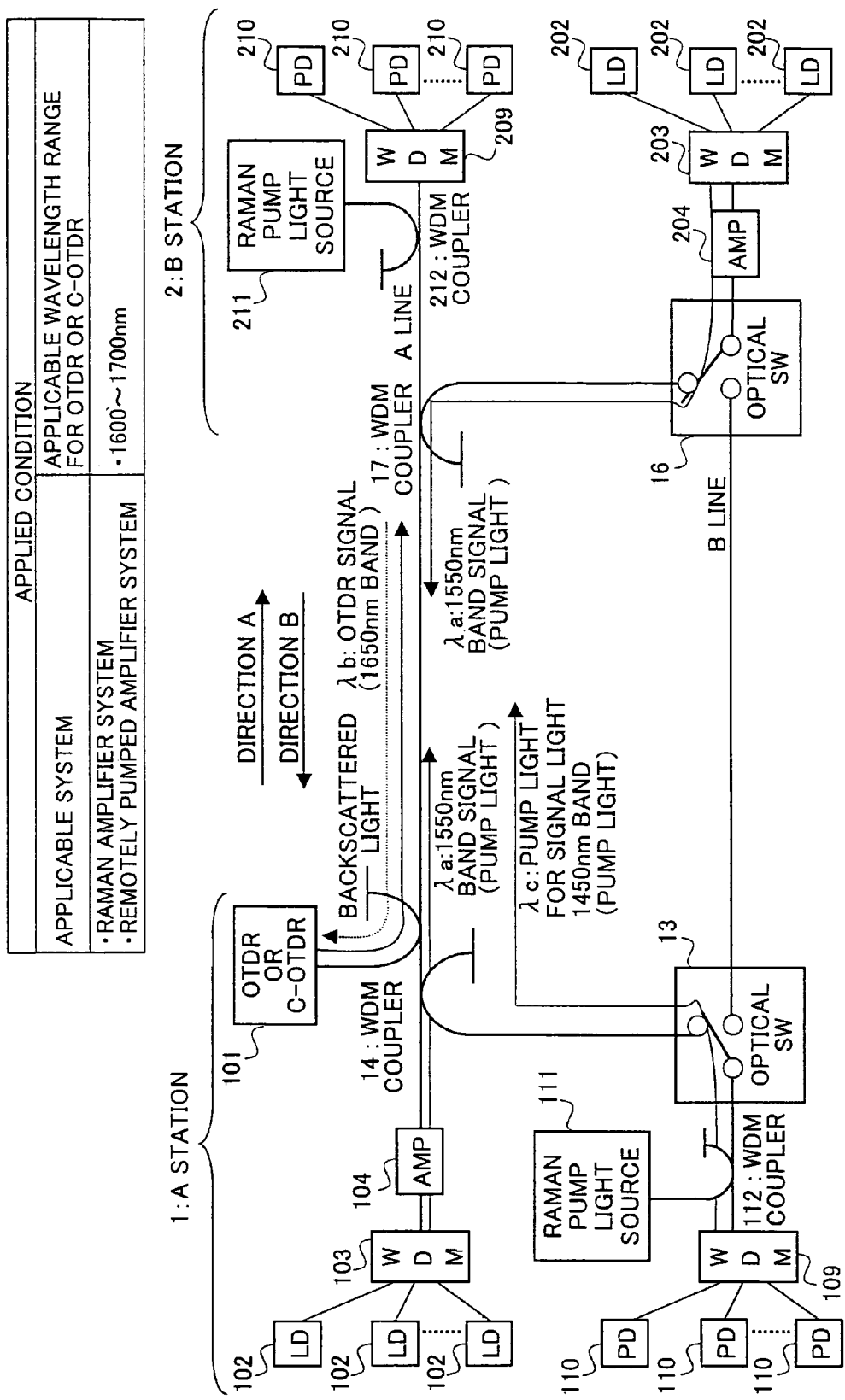
FIG. 7 is a figure for explaining an OTDR measurement method according to a fifth embodiment of the present invention.

FIG. 7 is a figure for explaining an OTDR measurement method according to the fifth embodiment of the present invention.

In the fifth embodiment, light of 1650 nm band (λb) is used as the OTDR signal light. The wavelength range of the OTDR signal light in this embodiment is 1600–1700 nm. The OTDR signal light (λb: 1650 nm band) from the OTDR 101 is Raman amplified by using the main signal light (λa: 1550 nm band) from the A station light source. In addition to that, the main signal light used for amplifying the OTDR signal light is Raman amplified by using pump light (λc: 1450 nm band) from the Raman pump light source 111 that is usually used for Raman amplifying signal light in the B direction on the B line, so that the OTDR signal light is further amplified. Further, the OTDR signal light is Raman amplified by using the main signal light (λa: 1550 nm band) from the B station light source as pump light.

In the fifth embodiment, the wavelength multiplexing/demultiplexing part 105 in the A line side shown in FIG. 1 functions as the WDM coupler 14 shown in FIG. 7. The WDM coupler 14 wavelength multiplexes the main signal light from the A station light source with the pump light come from the optical switch 13, and transmits the multiplexed light in the A direction. In addition, when OTDR measurement is performed, the optical switch 13 transmits the pump light from the Raman pump light source 111 to the WDM coupler 14 instead of to the B line.

The wavelength multiplexing/demultiplexing part 205 in the B line side in the B station 2 functions as the optical switch 16 shown in FIG. 7. When OTDR measurement is performed, the optical switch 16 switches the main signal light from the B station light source to the WDM coupler 17 in the A line side. Further, the wavelength multiplexing/demultiplexing part 208 in the A line side of the B station functions as the WDM coupler 17 shown in FIG. 7. The WDM coupler 17 transmits the main signal light sent from the B station light source and switched at the optical switch 16 to the A station 1 over the A line.

According to the fifth embodiment, the OTDR signal light (λb: 1650 nm band) is Raman amplified by using the main signal light (λa: 1550 nm band) as pump light. In addition to that, the main signal light used for amplifying the OTDR signal light is Raman amplified by using pump light (λc: 1450 nm band) from the Raman pump light source 111 that is usually used for Raman amplifying main signal light in the B direction, so that the OTDR signal light is further amplified. In addition to that, the OTDR signal light is further Raman amplified by using the main signal light (λa: 1550 nm band) from the B station light source as pump light. Therefore, the distance for measuring loss distribution along a length of optical fiber can be largely increased. In addition, since 1650 nm band is used as the OTDR signal light, long distance survey of a transmission line can be performed even in an optical transmission system including EDF.

(Sixth Embodiment)

Figure 8:
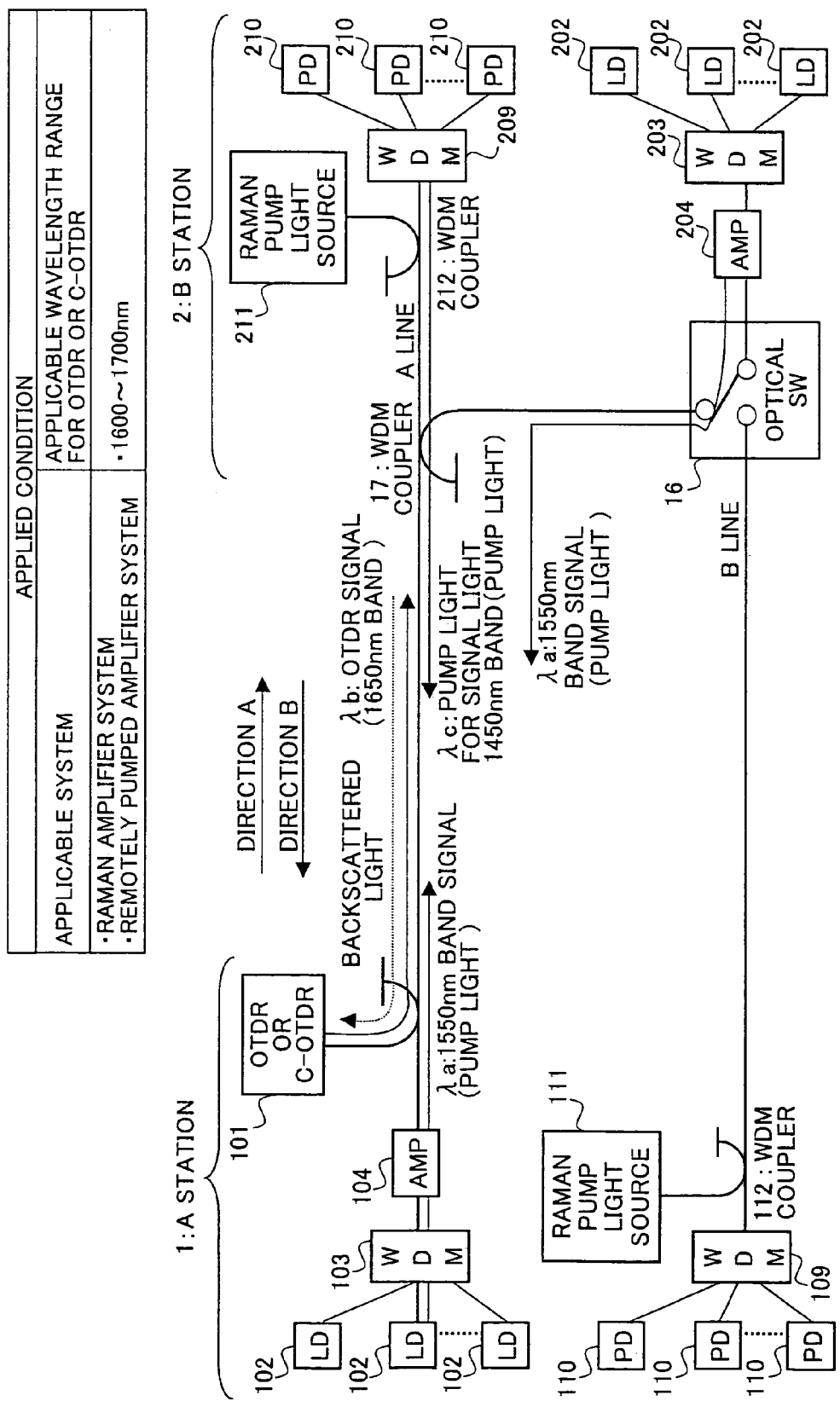
FIG. 8 is a figure for explaining an OTDR measurement method according to a sixth embodiment of the present invention.

FIG. 8 is a figure for explaining an OTDR measurement method according to the sixth embodiment of the present invention.

In the sixth embodiment, light of 1650 nm band (λb) is used as the OTDR signal light. The wavelength range of the OTDR signal light in this embodiment is 1600–1700 nm. The OTDR signal light (λb: 1650 nm band) from the OTDR 101 is Raman amplified by using the main signal light (λa: 1550 nm band) from the A station light source. In addition to that, the OTDR signal light is Raman amplified by using the main signal light (λa: 1550 nm band) from the B station light source as pump light, so that the OTDR signal light can be further Raman amplified. Furthermore, the bidirectional main signal light used for amplifying the OTDR signal light is Raman amplified by using pump light (λc: 1450 nm band) from the Raman pump light source 211 that is usually used for Raman amplifying signal light in the A direction on the A line, so that the OTDR signal light is further amplified. As a result, the distance for OTDR measurement is further increased.

In the sixth embodiment, the wavelength multiplexing/demultiplexing part 205 in the B line side in the B station 2 functions as an optical switch 16 shown in FIG. 8. When OTDR measurement is performed, the optical switch 16 switches the main signal light come from the B station light source, and transmits the main signal light to the WDM coupler 17 in the A line side. Further, the wavelength multiplexing/demultiplexing part 208 in the A line side of the B station functions as the WDM coupler 17 shown in FIG. 8. The WDM coupler 17 wavelength multiplexes the main signal light emitted from the B station light source and switched at the optical switch 16 with the pump light ($\lambda c$: 1450 nm band), and transmits the multiplexed light in the B direction over the A line.

In this embodiment, the bidirectional main signal light is used as the bidirectional pump light for amplifying the OTDR signal light. Further, the pump light ($\lambda c$: 1450 nm band) from the Raman pump light source 211 in the B station is used as pump light for amplifying the bidirectional main signal. Therefore, the distance for measuring loss distribution along a length of optical fiber can be largely increased. In addition, since 1650 nm band is used as the OTDR signal light, long distance survey of a transmission line can be performed even in an optical transmission system including EDF.

(Seventh Embodiment)

Figure 9:
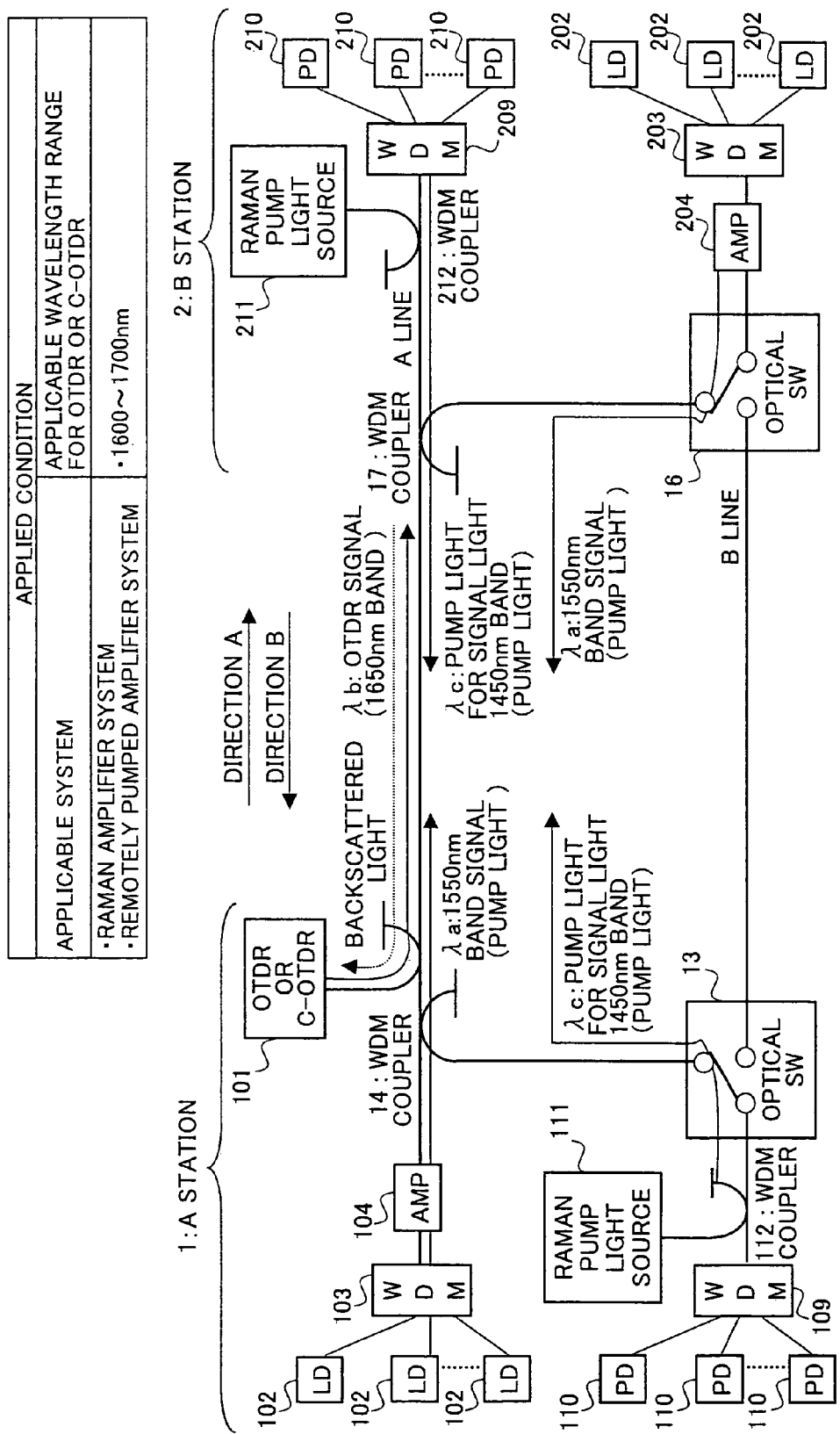
FIG. 9 is a figure for explaining an OTDR measurement method according to a seventh embodiment of the present invention.

FIG. 9 is a figure for explaining an OTDR measurement method according to the seventh embodiment of the present invention.

In the seventh embodiment, light of 1650 nm band ($\lambda b$) is used as the OTDR signal light. The wavelength range of the OTDR signal light in this embodiment is 1600–1700 nm. The OTDR signal light ($\lambda b$: 1650 nm band) from the OTDR 101 is Raman amplified by using the main signal light ($\lambda a$: 1550 nm band) from the A station light source. In addition to that, the main signal light used for amplifying the OTDR signal light is Raman amplified by using pump light ($\lambda c$: 1450 nm band) from the Raman pump light source 111 that is usually used for Raman amplifying the main signal light in the B direction, so that the OTDR signal light can be further Raman amplified. Further, the main signal light ($\lambda a$: 1550 nm band) from the B station light source is used as pump light for amplifying the OTDR signal light, and pump light ($\lambda c$: 1450 nm band) from the Raman pump light source 211 in the B station is used for Raman amplifying the bidirectional main signal light.

In this embodiment, the wavelength multiplexing/demultiplexing part 105 in the A line side shown in FIG. 1 functions as the WDM coupler 14 shown in FIG. 9. The WDM coupler 14 wavelength-multiplexes the main signal light from the A station light source with the pump light ($\lambda c$: 1450 nm band) come from the optical switch 13, and transmits the multiplexed light in the A direction. The wavelength multiplexing/demultiplexing part 108 functions as the optical switch 13. When OTDR measurement is performed, the optical switch 13 transmits the pump light from the Raman pump light source 111 to the WDM coupler 14 instead of to the B line.

The wavelength multiplexing/demultiplexing part 205 in the B line side in the B station 2 functions as the optical switch 16 shown in FIG. 9. When OTDR measurement is performed, the optical switch 16 transmits the main signal light come from the B station light source to the WDM coupler 17 in the A line side. Further, the wavelength multiplexing/demultiplexing part 208 in the A line side of the B station functions as the WDM coupler 17 shown in FIG. 9. The WDM coupler 17 wavelength multiplexes the main signal light emitted by the B station light source and switched at the optical switch 16 with pump light ($\lambda c$: 1450 nm band) from the Raman pump light source 211 of the B station, and transmits the multiplexed light to the B direction over the A line.

According to the present embodiment, the OTDR signal light is amplified by using bidirectional main signal light ($\lambda a$: 1550 nm band) as bidirectional pump light. In addition to that, the bidirectional main signal light is Raman amplified by bidirectional pump light ($\lambda c$: 1450 nm band), so that the OTDR signal light is further amplified, and the distance for measuring loss distribution along a length of optical fiber can be largely increased. In addition, since 1650 nm band is used as the OTDR signal light, long distance survey of a transmission line can be performed even in an optical transmission system including EDF.

(Eighth Embodiment)

Figure 10:
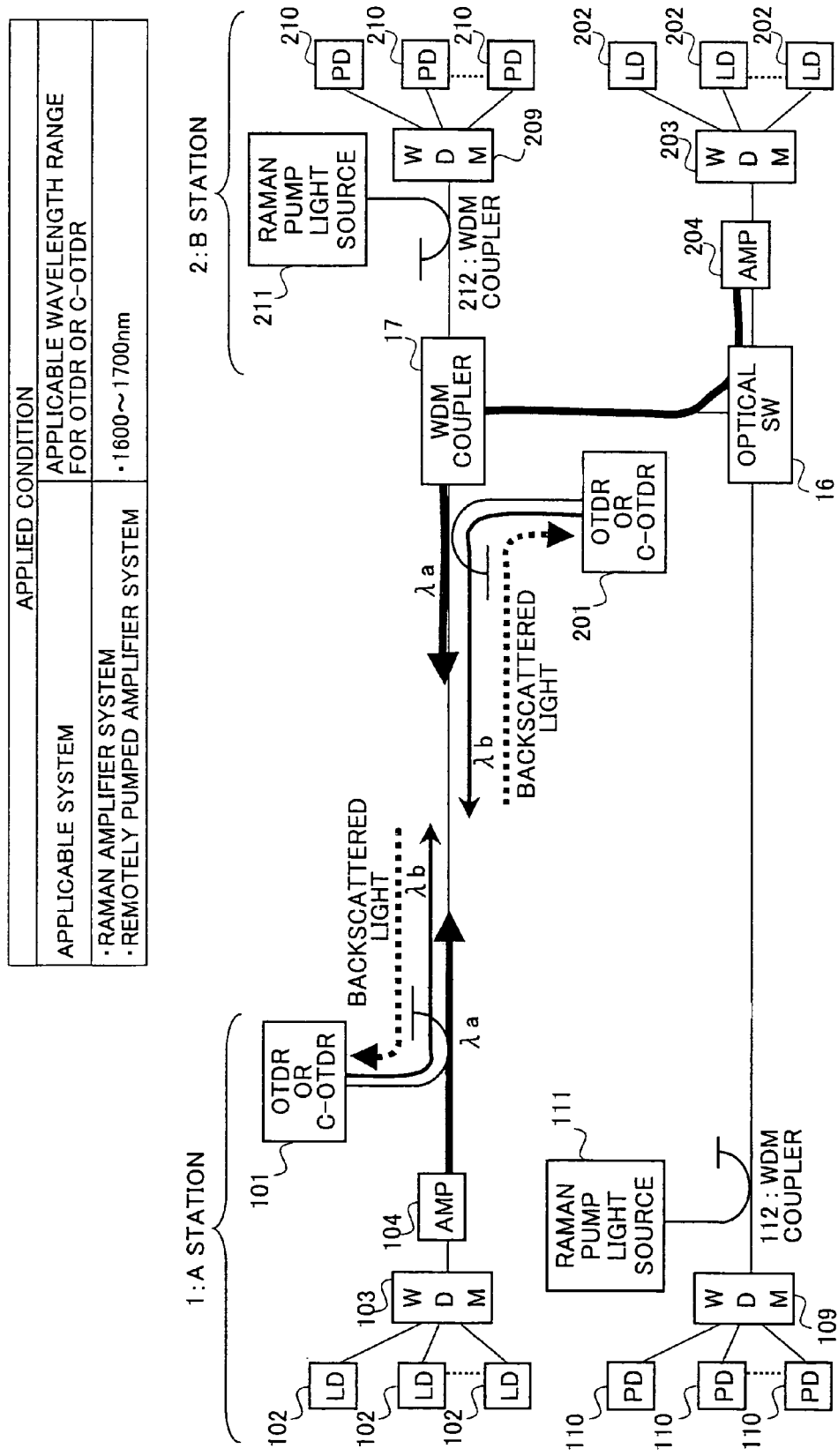
FIG. 10 is a figure for explaining an OTDR measurement method according to a eighth embodiment of the present invention.

Although OTDR measurement is performed from the A station 1 in each of the above embodiments, the B station can be also provided with an OTDR so that OTDR measurement is also performed from the B station in addition to the A station. FIG. 10 shows an example in which OTDR measurement is performed from both of the A and B stations. The example shown in FIG. 10 is based on the fourth embodiment in which OTDR signal light is Raman amplified by the bidirectional main signal light as an example.

Figure 11:
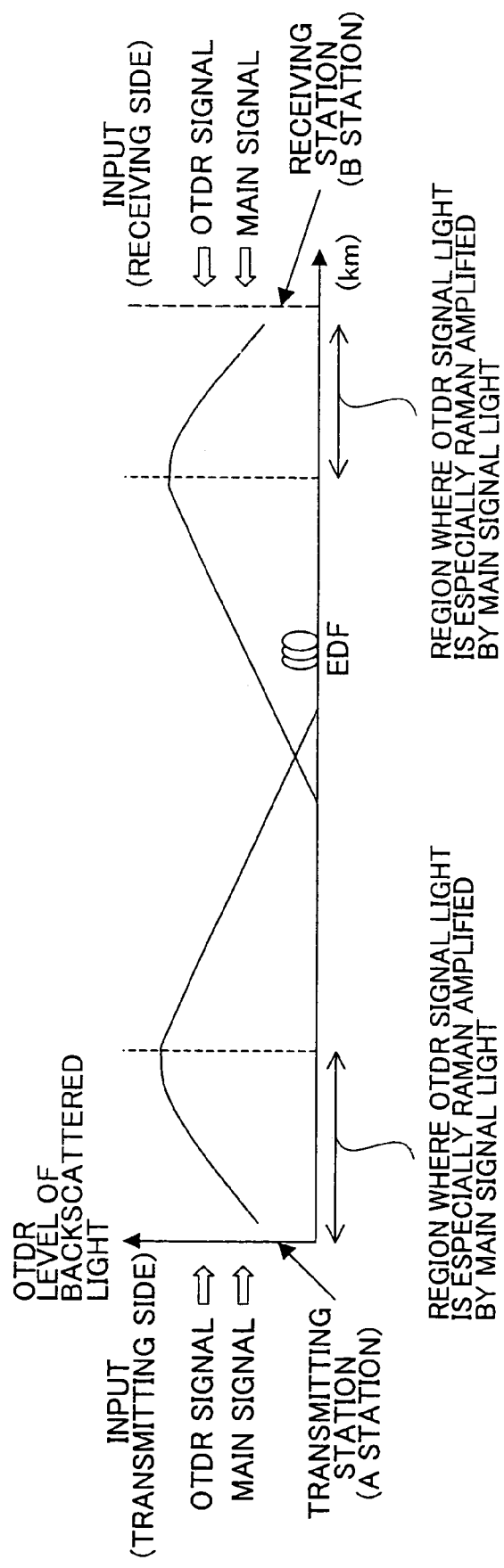
FIG. 11 is a figure for explaining effect obtained by performing OTDR measurement from both stations.

FIG. 11 is a figure for explaining effect obtained when OTDR measurement is performed from both stations. As shown in FIG. 11, the whole span of the optical transmission system that includes EDF can be surveyed by performed OTDR measurement from the both stations even when the distance between the both stations is too long to survey the whole span by performing OTDR measurement from only one side.

(Ninth Embodiment)

Figure 12:
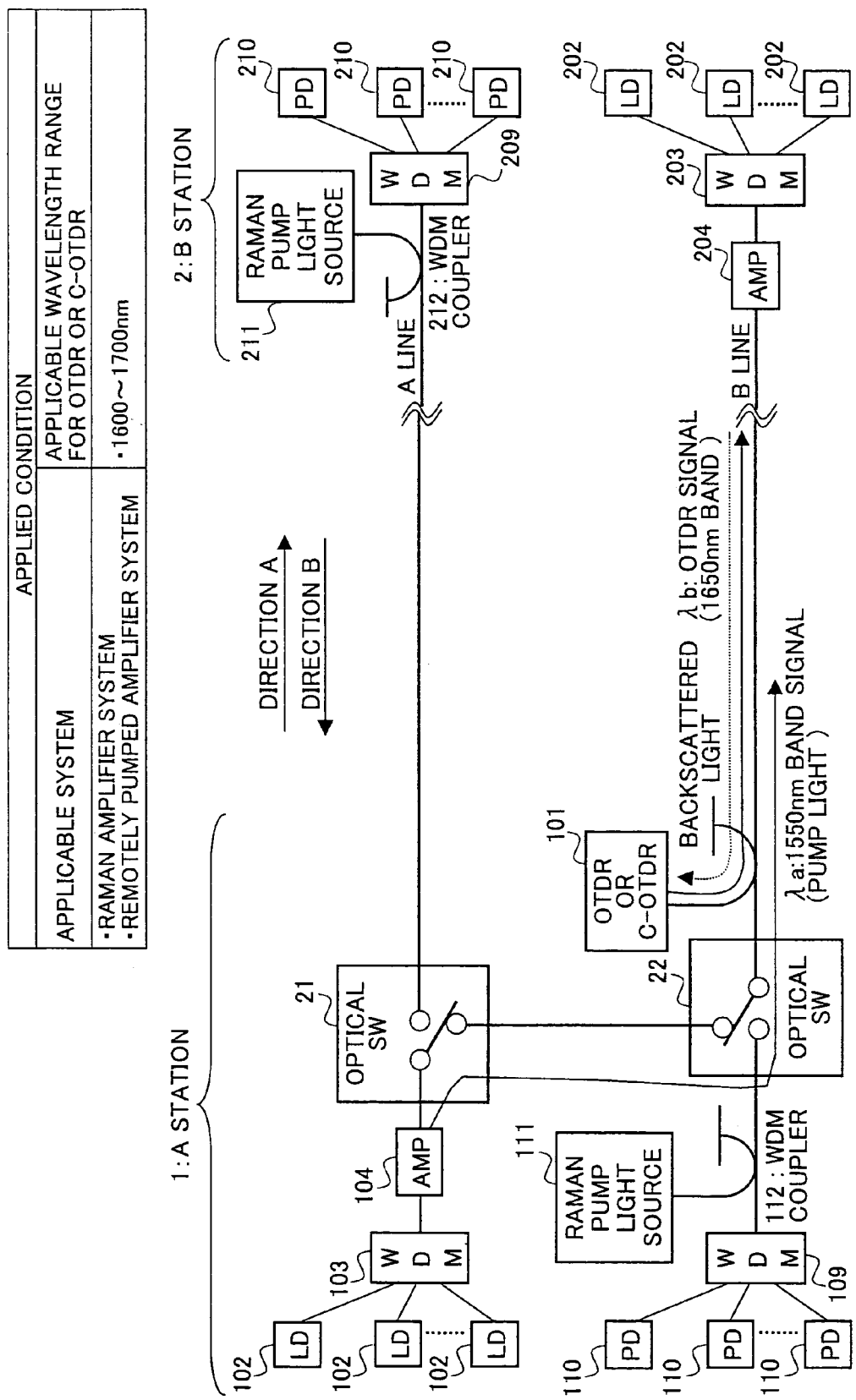
FIG. 12 is a figure for explaining an OTDR measurement method according to a ninth embodiment of the present invention.

FIG. 12 is a figure for explaining the OTDR measurement method according to the ninth embodiment of the present invention. In ninth to fifteenth embodiments, measurement for the B line is performed by providing an OTDR 101 in the B line side.

According to the ninth embodiment, light of 1650 nm band ($\lambda b$) is used as the OTDR signal light. The wavelength range of the OTDR signal light in this embodiment is 1600–1700 nm. The OTDR signal light ($\lambda b$: 1650 nm band) from the OTDR 101 is Raman amplified by using the main signal light ($\lambda a$: 1550 nm band) from the A station light source.

In the present embodiment, the wavelength multiplexing/demultiplexing parts 105 and 108 shown in FIG. 1 function as optical switches 21 and 22 respectively. When OTDR measurement is not performed, the optical switch 21 transmits the main signal light emitted from the A station light source over the A line. When the OTDR measurement is performed, the optical switch 21 transmits the main signal light emitted from the A station light source to the optical switch 22. As to the optical switch 22, when the OTDR measurement is not performed, the optical switch 22 transmits pump light from the Raman pump light source 111 in the A station over the B line. When OTDR measurement is performed, the optical switch 22 transmits the A station main signal light transmitted from the optical switch 21 to the B line.

According to the present embodiment, the effect same as the first embodiment can be obtained for the B line.

(Tenth Embodiment)

Figure 13:
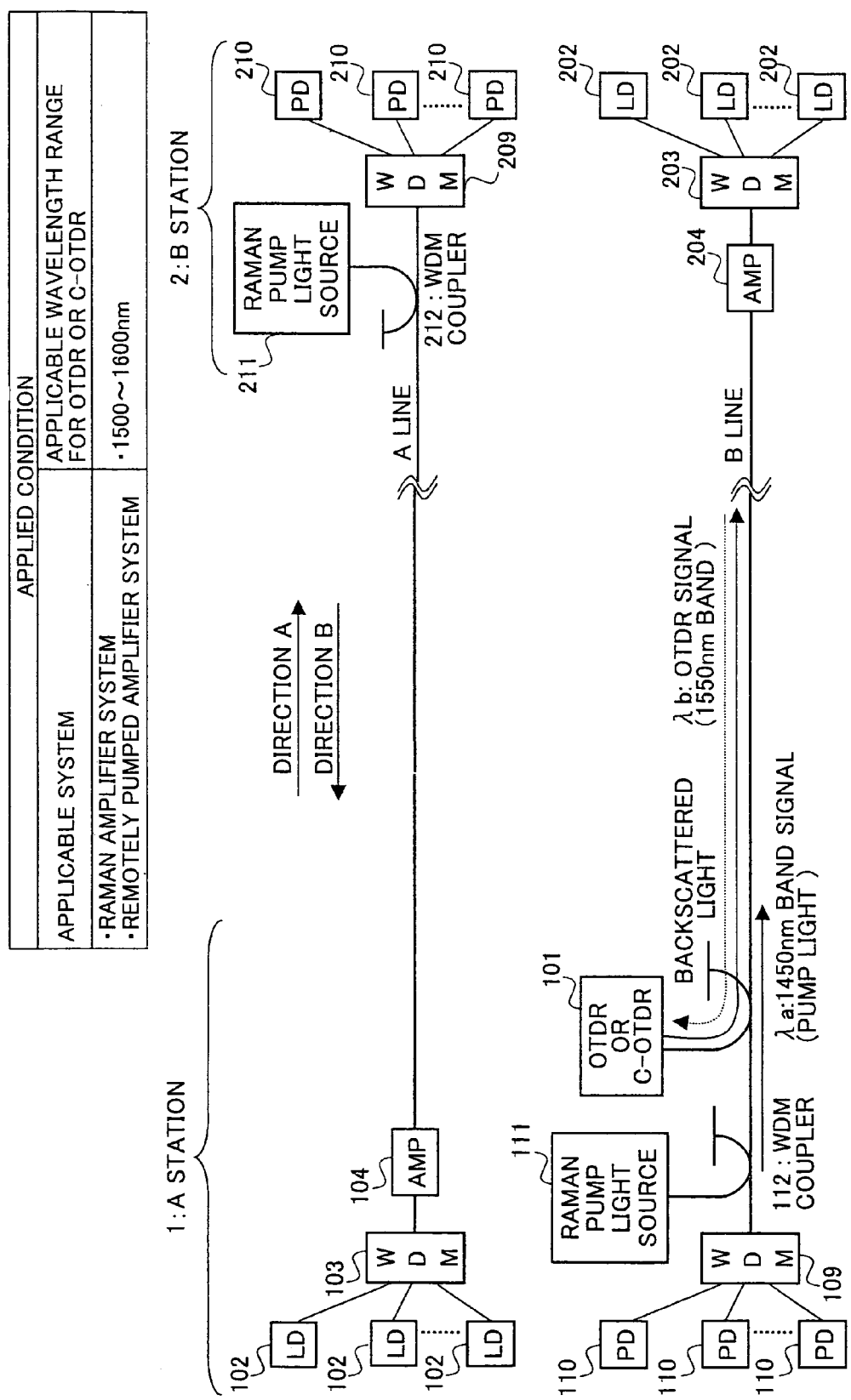
FIG. 13 is a figure for explaining an OTDR measurement method according to a tenth embodiment of the present invention.

FIG. 13 is a figure for explaining the OTDR measurement method according to the tenth embodiment of the present invention.

In the tenth embodiment, 1550 nm band (λa) that is the same as the main signal light is used as the OTDR signal light. The OTDR signal light is Raman amplified by using pump light (λc: 1450 nm band) emitted from the Raman pump light source 111 that is usually used for Raman amplifying the signal light in the B direction, so that the distance of OTDR measurement is increased. The wavelength range of the OTDR signal light in this embodiment is 1500–1600 nm. The wavelength multiplexing/demultiplexing part may not be provided in this embodiment.

According to the present embodiment, the same effect obtained by the second embodiment can be obtained for the B line.

(Eleventh Embodiment)

Figure 14:
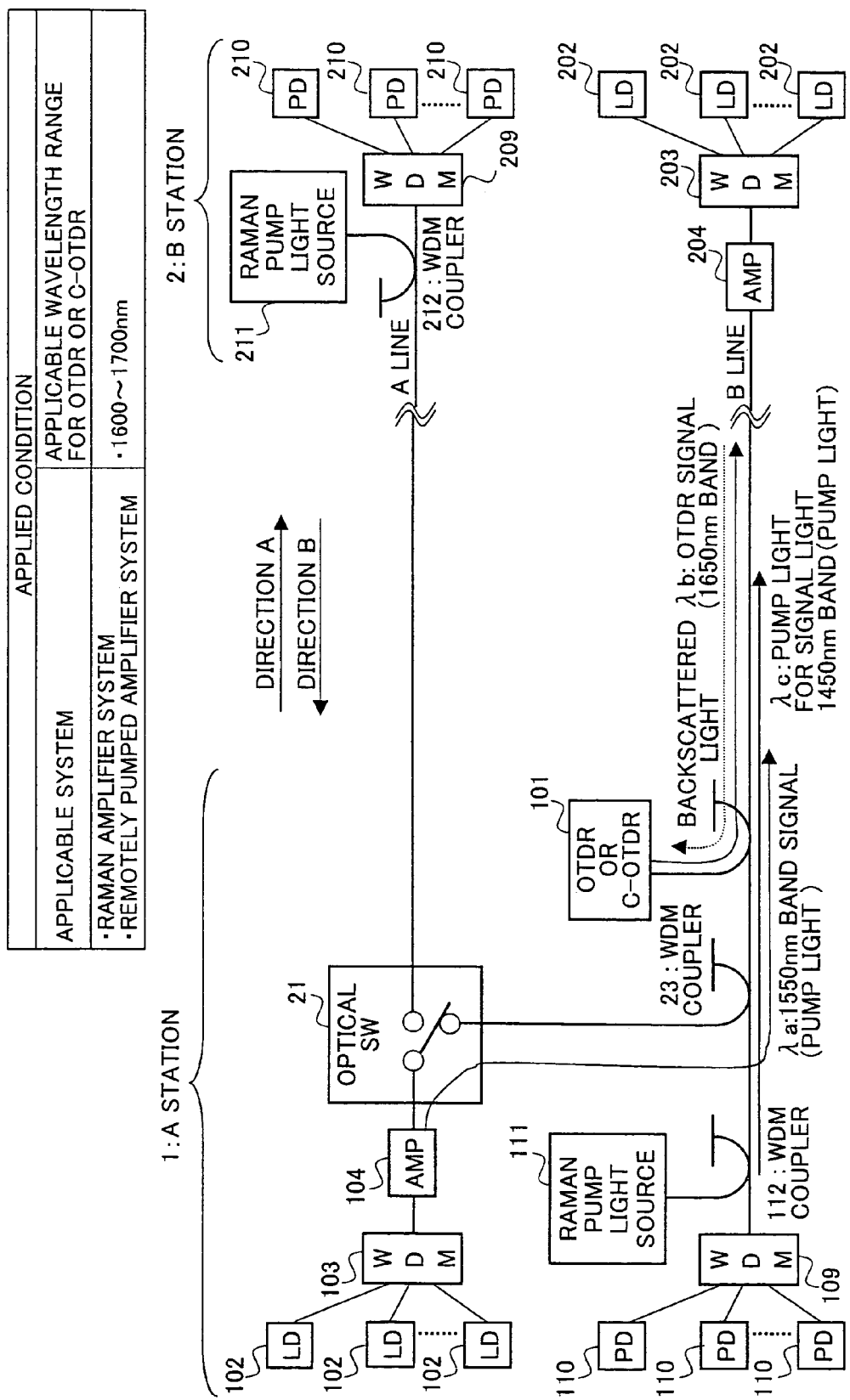
FIG. 14 is a figure for explaining an OTDR measurement method according to a eleventh embodiment of the present invention.

FIG. 14 is a figure for explaining an OTDR measurement method according to the eleventh embodiment of the present invention.

In the eleventh embodiment, light of 1650 nm band (λb) is used as the OTDR signal light. The wavelength range of the OTDR signal light in this embodiment is 1600–1700 nm. The OTDR signal light (λb: 1650 nm band) from the OTDR 101 is Raman amplified by using the main signal light (λa: 1550 nm band) from the A station light source. Further, the main signal light (λa: 1550 nm band) used for amplifying the OTDR signal light is Raman amplified by using pump light (λc: 1450 nm band) emitted from the Raman pump light source 111. That is, λa is pumped by using first-order Stokes wave of λc, and λb is pumped by using the original power of λa as first-order Stokes wave and using the power of λa pumped by λc as second-order Stokes wave. Accordingly, the OTDR signal light is amplified so that dynamic range is enlarged and the distance of OTDR measurement is increased.

In this embodiment, the wavelength multiplexing/demultiplexing part 105 in the A line side functions as the optical switch 21 shown in FIG. 14. The wavelength multiplexing/demultiplexing part 108 functions as the WDM coupler 23 shown in FIG. 14.

When OTDR measurement is performed, the optical switch 21 transmits the main signal light from the A station light source to the WDM coupler 23 not to the A line. The WDM coupler 23 wavelength-multiplexes the main signal light from the A station light source with the pump light from A station Raman pump light source 111, and transmits the multiplexed light in the A direction over the B line.

According to the present embodiment, the same effect obtained by the third embodiment can be obtained for the B line.

(Twelfth Embodiment)

Figure 15:
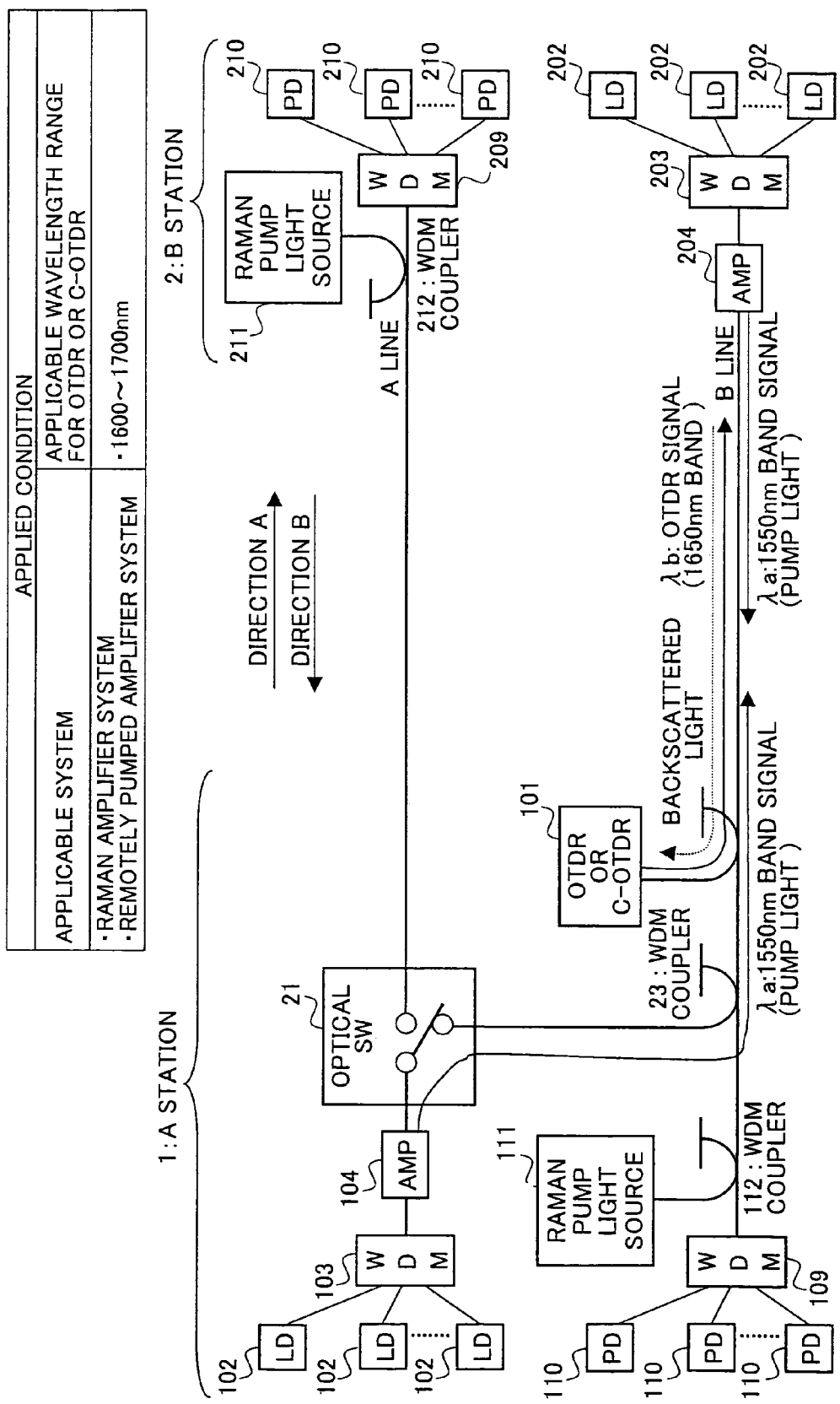
FIG. 15 is a figure for explaining an OTDR measurement method according to a twelfth embodiment of the present invention.

FIG. 15 is a figure for explaining an OTDR measurement method according to the twelfth embodiment of the present invention.

In the twelfth embodiment, light of 1650 nm band (λb) is used as the OTDR signal light. The wavelength range of the OTDR signal light in this embodiment is 1600–1700 nm. The OTDR signal light (λb: 1650 nm band) from the OTDR 101 is Raman amplified by using the main signal light (λa: 1550 nm band) from the A station light source. In addition to that, the OTDR signal light is Raman amplified by using main signal light from the B station light source as pump light for the OTDR signal light. That is, bidirectional main signal light is used as bidirectional pump light for Raman amplifying the OTDR signal light.

In the twelfth embodiment, the wavelength multiplexing/demultiplexing part 105 shown in FIG. 1 functions as the optical switch 21 shown in FIG. 15. Further, the wavelength multiplexing/demultiplexing part 108 functions as the WDM coupler 23 shown in FIG. 15. When OTDR measurement is performed, the optical switch 21 transmits the main signal light from the A station light source to the WDM coupler 23 not to the A line. The WDM coupler 23 transmits the main signal light in the A direction over the B line.

According to the present embodiment, the same effect obtained by the fourth embodiment can be obtained for the B line.

(Thirteenth Embodiment)

Figure 16:
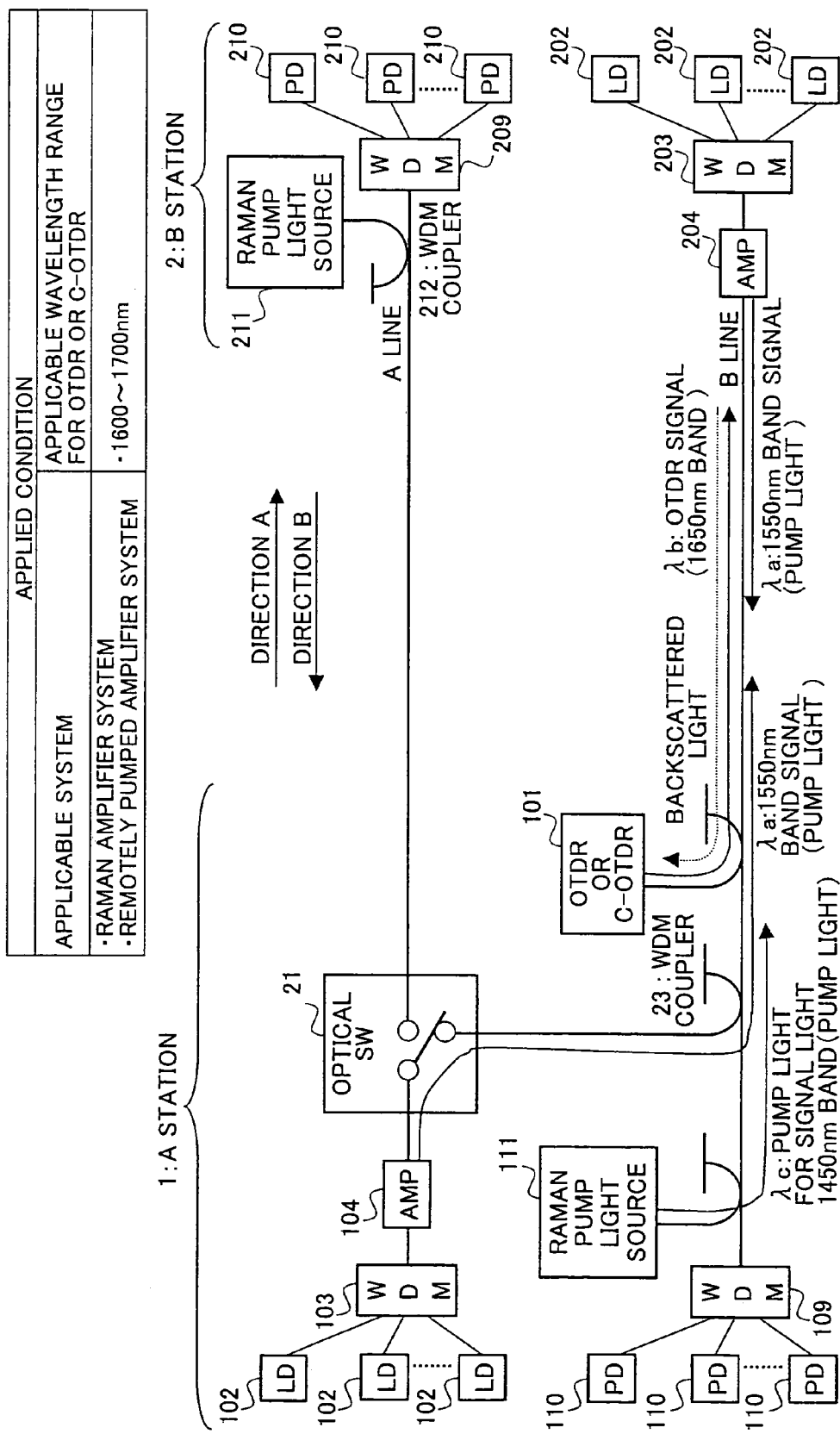
FIG. 16 is a figure for explaining an OTDR measurement method according to a thirteenth embodiment of the present invention.

FIG. 16 is a figure for explaining an OTDR measurement method according to the thirteenth embodiment of the present invention.

In the thirteenth embodiment, light of 1650 nm band (λb) is used as the OTDR signal light. The wavelength range of the OTDR signal light in this embodiment is 1600–1700 nm. The OTDR signal light (λb: 1650 nm band) from the OTDR 101 is Raman amplified by using the main signal light (λa: 1550 nm band) from the A station light source. In addition to that, the main signal light used for amplifying the OTDR signal light is Raman amplified by using pump light (λc: 1450 nm band) from the Raman pump light source 111 that is usually used for Raman amplifying signal light in the B direction, so that the OTDR signal light is further amplified. Further, the OTDR signal light is Raman amplified by using the main signal light (λa: 1550 nm band) from the B station light source as pump light. That is, bidirectional main signal light is used as bidirectional pump light for Raman amplification. Further, the main signal light (λa: 1550 nm band) used for amplifying the OTDR signal light is Raman amplified by using pump light (λc: 1450 nm band) from the Raman pump light source 111.

In the present embodiment, the wavelength multiplexing/demultiplexing part 105 shown in FIG. 1 functions as the optical switch 21 shown in FIG. 16. The wavelength multiplexing/demultiplexing part 108 functions as the WDM coupler 23 shown in FIG. 16. When OTDR measurement is performed, the optical switch 21 transmits the main signal light from the A station light source to the WDM coupler 23 not to the A line. The WDM coupler 23 wavelength multiplexes the main signal light from the A station light source with the pump light come from the Raman pump light source 111, and transmits the multiplexed light in the A direction over the B line.

According to the present embodiment, the same effect obtained by the fifth embodiment can be obtained for the B line.

(Fourteenth Embodiment)

Figure 17:
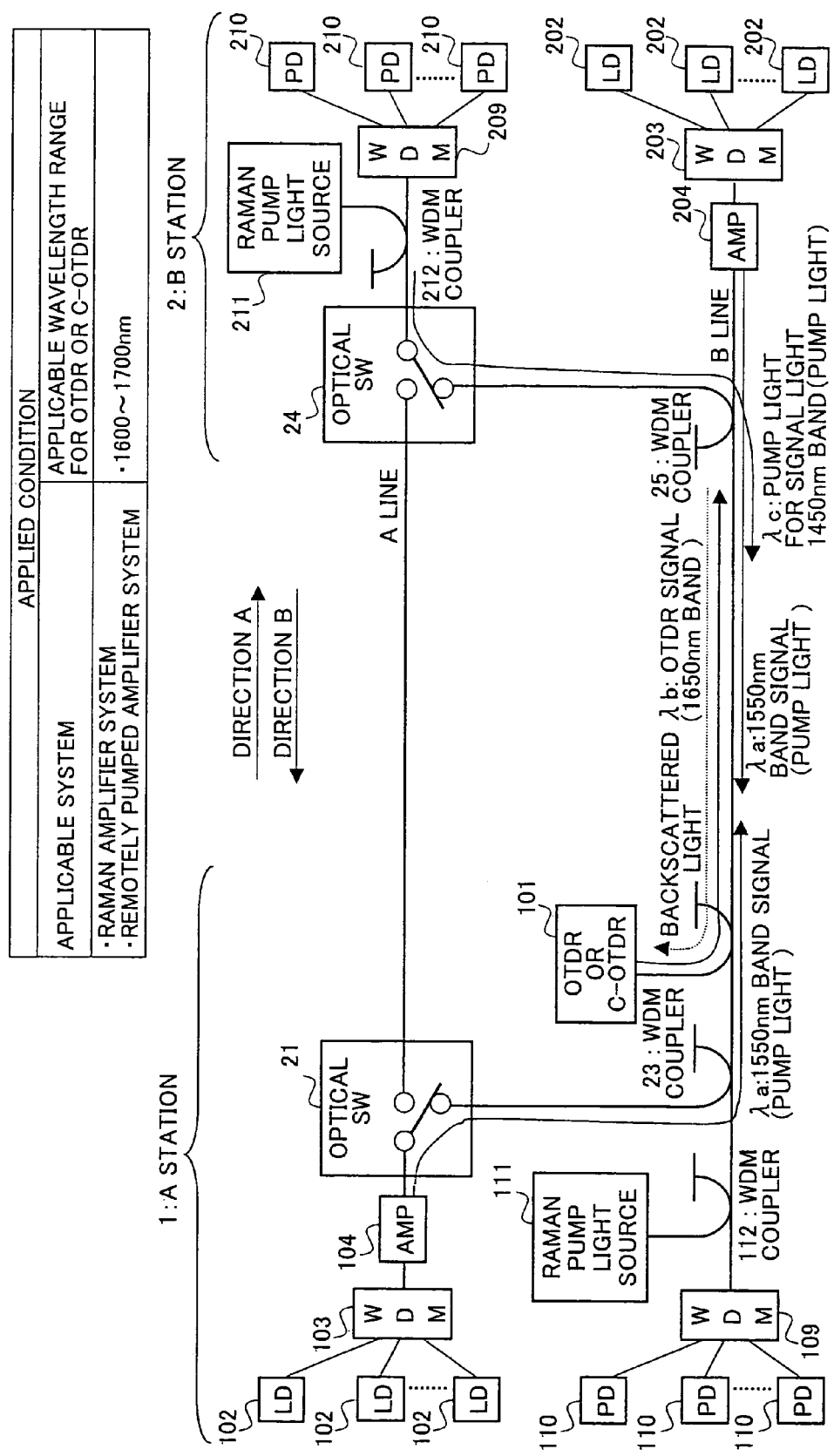
FIG. 17 is a figure for explaining an OTDR measurement method according to a fourteenth embodiment of the present invention.

FIG. 17 is a figure for explaining an OTDR measurement method according to the fourteenth embodiment of the present invention.

In the fourteenth embodiment, light of 1650 nm band (λb) is used as the OTDR signal light. The wavelength range of the OTDR signal light in this embodiment is 1600–1700 nm. The OTDR signal light (λb: 1650 nm band) from the OTDR 101 is Raman amplified by using the main signal light (λa: 1550 nm band) from the A station light source. In addition to that, the OTDR signal light is Raman-amplified by using the main signal light (λa: 1550 nm band) from the B station light source as pump light, so that the OTDR signal light can be further Raman amplified. Further, the main signal light (λa: 1550 nm band) that is used for amplifying the OTDR signal light is Raman amplified by using the pump light (λc: 1450 nm band) from the B station Raman pump light source 211. That is, bidirectional main signal light is used as bidirectional pump light for Raman amplifying, and the bidirectional main signal light (λa: 1550 nm band) is Raman amplified by using the pump light (λc: 1450 nm band) from the B station Raman pump light source 211.

In the present embodiment, the wavelength multiplexing/demultiplexing part 105 shown in FIG. 1 functions as the optical switch 21 shown in FIG. 17. The wavelength multiplexing/demultiplexing part 108 functions as the WDM coupler 23 shown in FIG. 17. The operations of the optical switch 21 and the WDM coupler 23 are the same as those in the twelfth embodiment.

The wavelength multiplexing/demultiplexing part 208 in the B line side in the B station functions as the optical switch 24 shown in FIG. 17. When OTDR measurement is performed, the optical switch 24 transmits the pump light from the Raman pump light source 211 to the WDM coupler 25. Further, the wavelength multiplexing/demultiplexing part 205 in the B line side functions as the WDM coupler 25 shown in FIG. 17. The WDM coupler 25 wavelength multiplexes the main signal light emitted by the B station light source with pump light that is switched at the optical switch 24, and transmits the multiplexed light to the A station over the B line.

According to the present embodiment, the same effect obtained by the sixth embodiment can be obtained for the B line.

(Fifteenth Embodiment)

Figure 18:
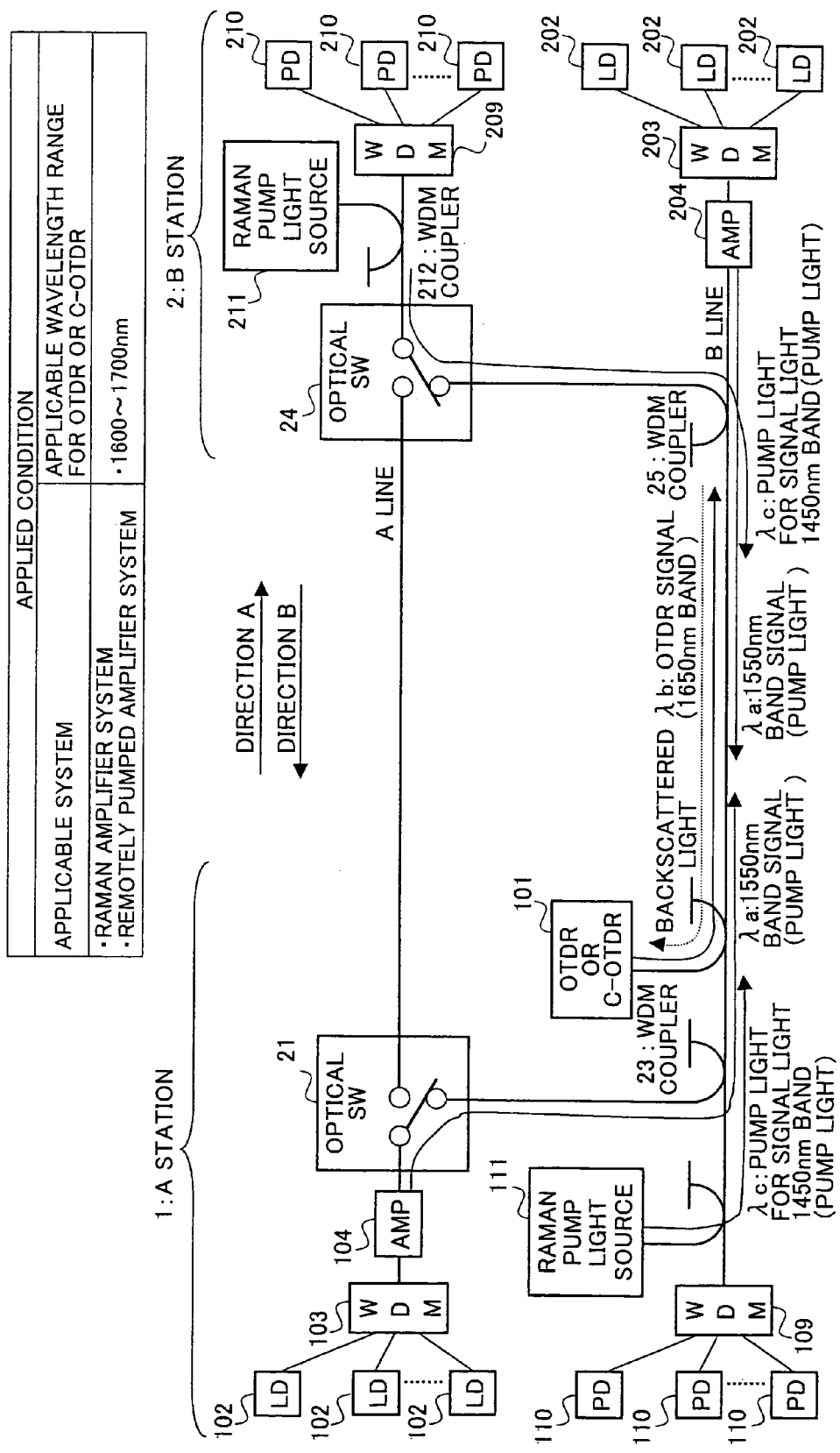
FIG. 18 is a figure for explaining an OTDR measurement method according to a fifteenth embodiment of the present invention.

FIG. 18 is a figure for explaining an OTDR measurement method according to the fifteenth embodiment of the present invention.

In the fifteenth embodiment, light of 1650 nm band (λb) is used as the OTDR signal light. The wavelength range of the OTDR signal light in this embodiment is 1600–1700 nm. The OTDR signal light (λb: 1650 nm band) from the OTDR 101 is Raman amplified by using the main signal light (λa: 1550 nm band) from the A station light source. In addition to that, the main signal light used for amplifying the OTDR signal light is Raman amplified by using pump light (λc: 1450 nm band) from the Raman pump light source 111 that is usually used for Raman amplifying the main signal light in the B direction. Further, the OTDR signal light is Raman amplified by using the main signal light from the B station. Furthermore, the main signal light (λa: 1550 nm band) used for amplifying the OTDR signal light is Raman amplified by using the pump light (λc: 1450 nm band) from the Raman pump light source 211 in the B station. That is, bidirectional main signal light is used as bidirectional pump light. Further, the bidirectional main signal light used for amplifying the OTDR signal light is Raman amplified by using the pump light (λc: 1450 nm band) from the Raman pump light sources in the A and B stations.

In this embodiment, the wavelength multiplexing/demultiplexing part 105 shown in FIG. 1 functions as the optical switch 21 shown in FIG. 18. The wavelength multiplexing/demultiplexing part 108 functions as the WDM coupler 23 shown in FIG. 18. The operations of the optical switch 21 and the WDM coupler 23 are the same as those in the thirteenth embodiment.

In addition, the wavelength multiplexing/demultiplexing part 208 in the B line side in the B station functions as the optical switch 24 shown in FIG. 18. The wavelength multiplexing/demultiplexing part 205 in the B line side functions as the WDM coupler 25 shown in FIG. 18. The operations of the optical switch 24 and the WDM coupler 25 are the same as those in the thirteenth embodiment.

According to the present embodiment, the same effect obtained by the seventh embodiment can be obtained for the B line.

(Sixteenth Embodiment)

Figure 19:
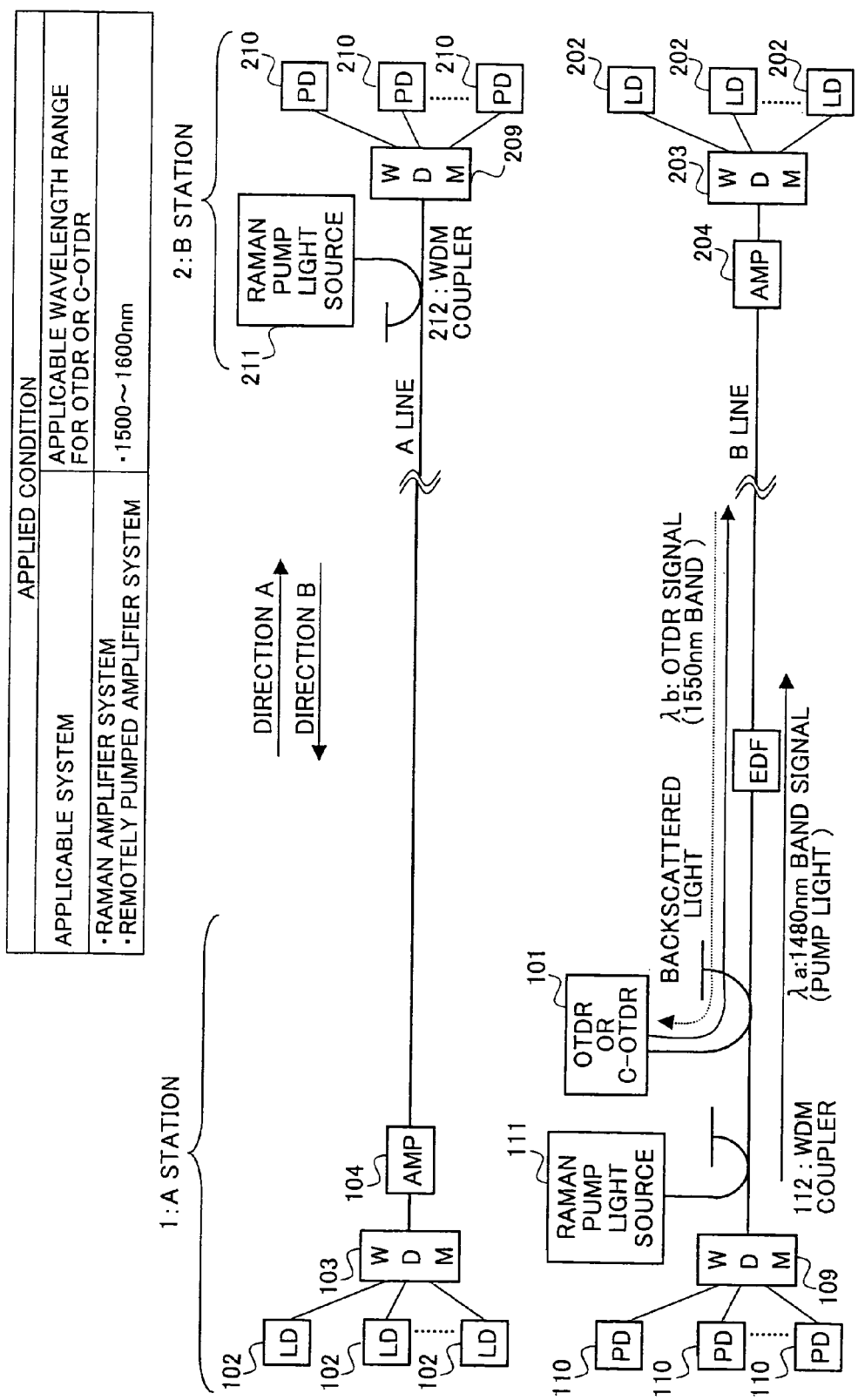
FIG. 19 is a figure for explaining an OTDR measurement method according to a sixteenth embodiment of the present invention.

FIG. 19 is a figure for explaining an OTDR measurement method according to the sixteenth embodiment of the present invention.

In the sixteenth embodiment, the light of 1550 nm band (λa) same as the main signal light is used as the OTDR signal light. The OTDR signal light is remotely pumped by using pump light (λc: 1480 nm band) emitted from the remote pump light source 111 that is usually used for remotely pumping the signal light in the B direction. The wavelength range of the OTDR signal light in this embodiment is 1500–1600 nm. The wavelength multiplexing/demultiplexing part may not be provided in the present embodiment.

According to the present invention, the main signal light can be used as pump light for the OTDR signal light. Therefore, long span survey can be realized in the no-relay optical transmission system without newly providing any pump light source for the OTDR signal light. In addition, pump light usually used for pumping the main signal light can be used as pump light for the main signal light that is used for pumping the OTDR signal light. Therefore, the OTDR signal light can be further Raman amplified, so that long span survey of an optical transmission line can be realized. Further, by using 1650 nm band or 1480 nm band as the OTDR signal light, OTDR measurement can be performed beyond EDF in an optical transmission system including EDF.

The present invention is not limited to the specifically disclosed embodiments, and variations and modifications may be made without departing from the scope of the present invention.

What is claimed is:

1. A method for performing OTDR measurement in an optical transmission system including a first terminal station and a second terminal station,
wherein OTDR signal light is transmitted from an OTDR provided in the first terminal station to the second terminal station, in which the OTDR signal light is Raman amplified by using main signal light of the optical transmission system as pump light.

2. The method as claimed in claim 1, wherein the OTDR signal light is Raman amplified by using the main signal light that is transmitted from the first terminal station.

3. The method as claimed in claim 1, the OTDR signal light is Raman amplified by using the main signal light transmitted from the second terminal station.

4. The method as claimed in claim 1, wherein the main signal light used as the pump light for the OTDR signal light is Raman amplified by using pump light, transmitted from the first terminal station, that is usually used for Raman amplifying main signal light transmitted from the second terminal station to the first terminal station.

5. The method as claimed in claim 1, wherein the main signal light used as the pump light for the OTDR signal light is Raman amplified by using pump light, transmitted from the second terminal station, that is usually used for Raman amplifying main signal light transmitted from the first terminal station to the second terminal station.

6. The method as claimed in claim 1, wherein a wavelength band of the main signal light of the optical transmission system is 1550 nm band, and a wavelength band of the OTDR signal light is 1650 nm band.

7. A method for performing OTDR measurement in an optical transmission system including a first terminal station and a second terminal station, wherein OTDR signal light is transmitted from an OTDR provided in the first terminal station to the second terminal station, in which the OTDR signal light is Raman amplified by using pump light for main signal light of the optical transmission system.

8. The method as claimed in claim 7, wherein a wavelength band of the pump light for the main signal light in the optical transmission system is 1450 nm band or 1480 nm band, and a wavelength band of the OTDR signal light is 1550 nm band.

9. A method for performing OTDR measurement in an optical transmission system including a first terminal station and a second terminal station, and an EDF (erbium doped fiber) between the first terminal station and the second terminal station, wherein OTDR signal light is transmitted from an OTDR provided in the first terminal station to the second terminal station, in which the OTDR signal light is remote pump amplified and Raman amplified by using pump light for remote pump amplification that is transmitted from the first terminal station.

10. The method as claimed in claim 9, wherein a wavelength band of each of main signal light in the optical transmission system and the OTDR signal light is 1550 nm band.

* * * * *